US 6,683,745 B1

United States Patent
Sri-Jayantha et al.

(10) Patent No.: US 6,683,745 B1
(45) Date of Patent: Jan. 27, 2004

(54) ROTATIONALLY FREE MOUNT SYSTEM FOR DISK DRIVE HAVING A ROTARY ACTUATOR

(75) Inventors: Sri M. Sri-Jayantha, Ossining, NY (US); Vijayeshwar Das Khanna, Millwood, NY (US); Gerard McVicker, Stormville, NY (US); Hien Dang, Nanuet, NY (US); Arun Sharma, New Rochelle, NY (US); Kiyoshi Satoh, Fujisawa (JP); Tatsuo Nakamoto, Sagamihara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/472,175

(22) Filed: Dec. 27, 1999

(51) Int. Cl.[7] .................. G11B 17/00; G11B 5/012; G11B 33/14
(52) U.S. Cl. .................. 360/97.01; 360/97.02
(58) Field of Search .......... 360/97.01, 97.02; 361/685, 684; 369/263

(56) References Cited

U.S. PATENT DOCUMENTS

| 4,967,293 A | 10/1990 | Aruga et al. | 360/78.12 |
|---|---|---|---|
| 5,349,486 A | 9/1994 | Sugimoto et al. | 360/97.01 |
| 5,400,196 A | 3/1995 | Moser et al. | 360/97.02 |
| 5,608,586 A | 3/1997 | Sri-Jayantha et al. | 360/77.04 |
| 5,740,011 A * | 4/1998 | Kobayashi et al. | 361/685 |
| 6,122,139 A * | 9/2000 | Sri-Jayantha et al. | 360/97.02 |
| 6,219,315 B1 * | 4/2001 | Buchs et al. | 369/44.11 |
| 6,219,909 B1 * | 4/2001 | Ogawa et al. | 29/840 |
| 6,314,077 B1 * | 11/2001 | Shishido et al. | 369/263 |
| 6,402,219 B1 * | 6/2002 | Hopf et al. | 296/70 |
| 6,426,935 B1 * | 7/2002 | Imai et al. | 369/263 |
| 2002/0034036 A1 * | 3/2002 | Sri-Jayantha et al. | 360/77.02 |

FOREIGN PATENT DOCUMENTS

| EP | 0 715 308 A2 | 6/1996 |
| JP | 2565637 B2 | 10/1996 |

OTHER PUBLICATIONS

Machine translation of Boigenzahn et al JP06–012852, related to JP 2565637 B2 disclosed by Applicant.*

* cited by examiner

*Primary Examiner*—Julie Anne Watko
(74) *Attorney, Agent, or Firm*—McGinn & Gibb, PLLC

(57) ABSTRACT

A system for mounting a hard disk enclosure (HDE), includes a casing pivotably mounted to minimize at least one of settle-out dynamics, external rotational vibration, and emitted vibration, the casing allowing the HDE to rotate substantially freely, wherein the center of gravity of the HDE is substantially the same as a pivot point of the casing. Further, a computer chassis includes a housing, at least one disk drive assembly for being housed by the housing, and a plurality of theta-mounts integrally built within the housing.

37 Claims, 32 Drawing Sheets

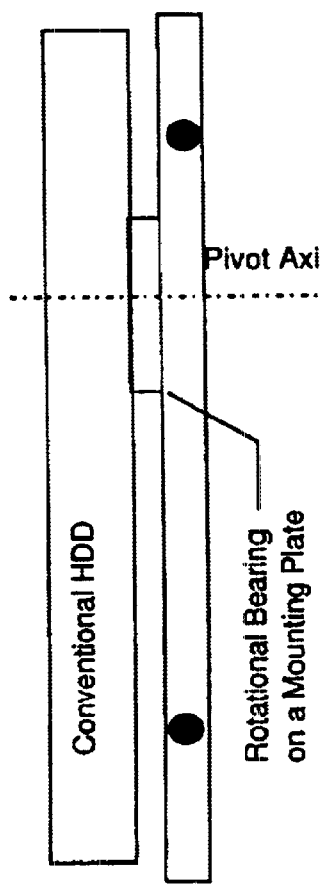
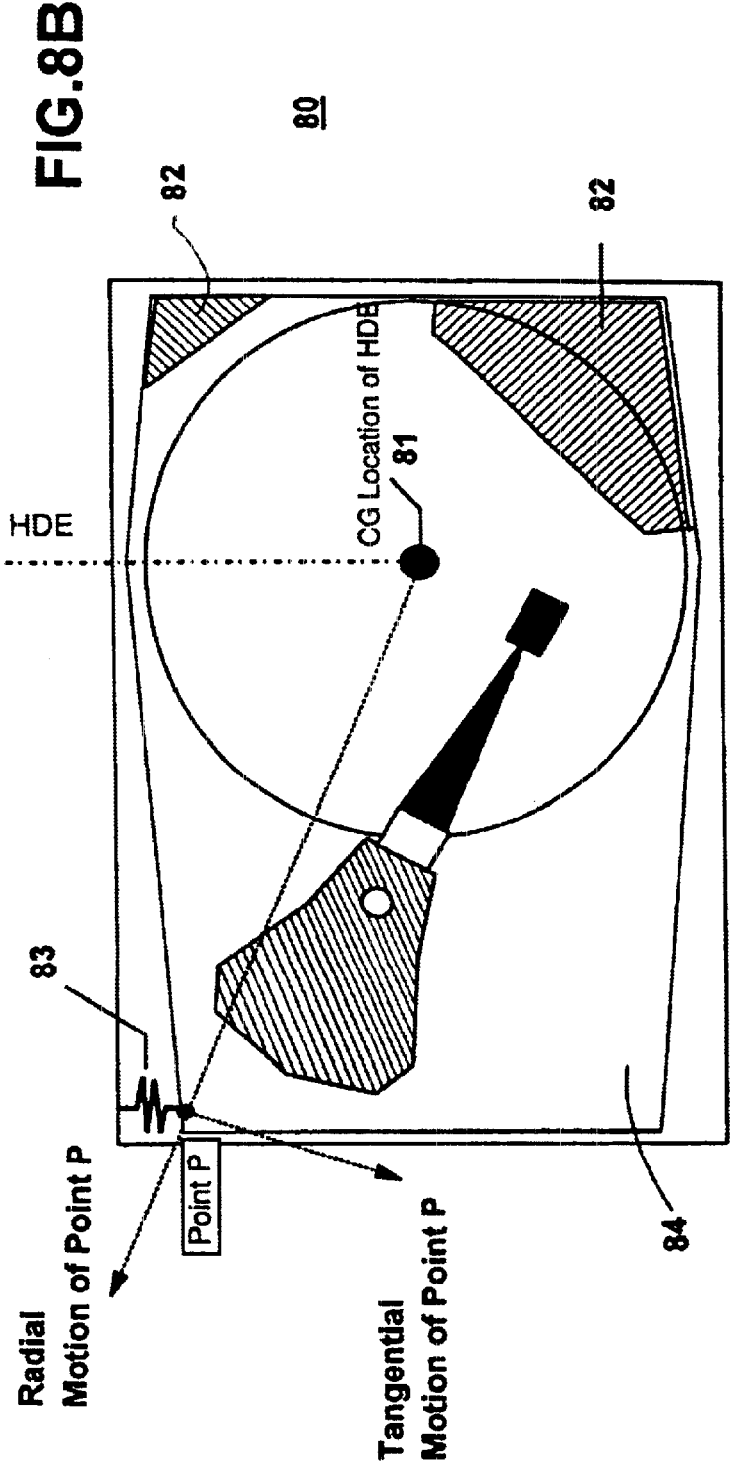

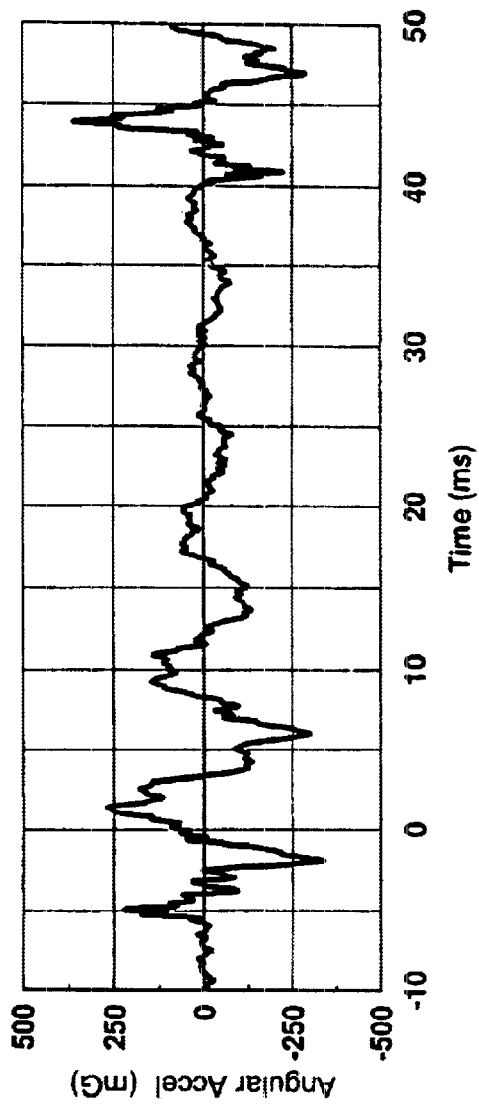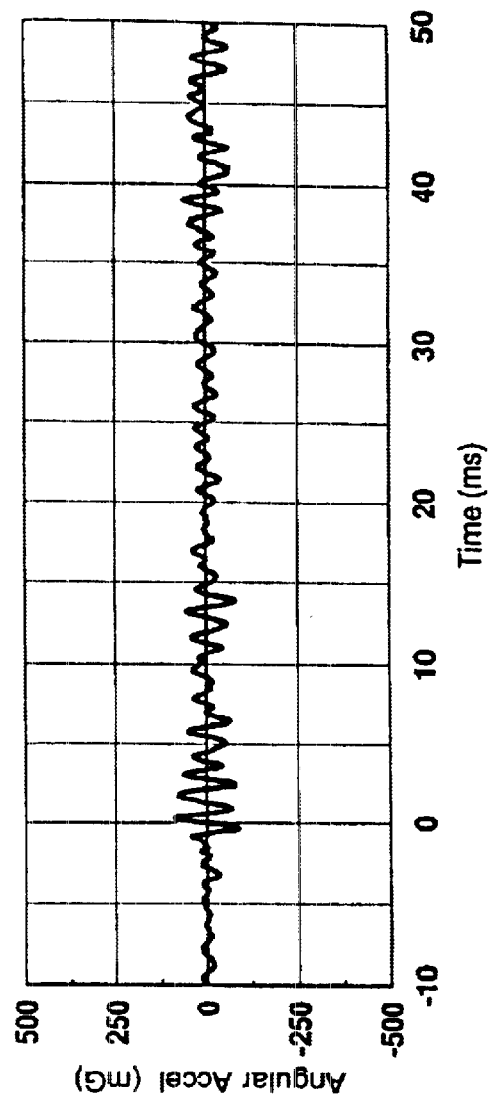
FIG.16A Direct Mount
FIG.16B Theta-Mount

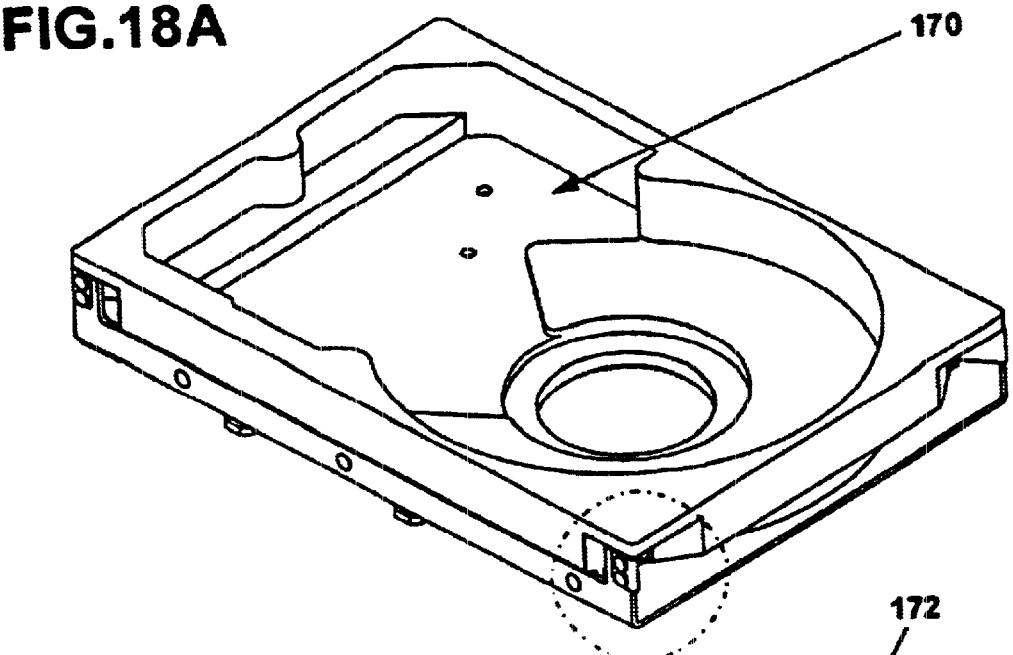
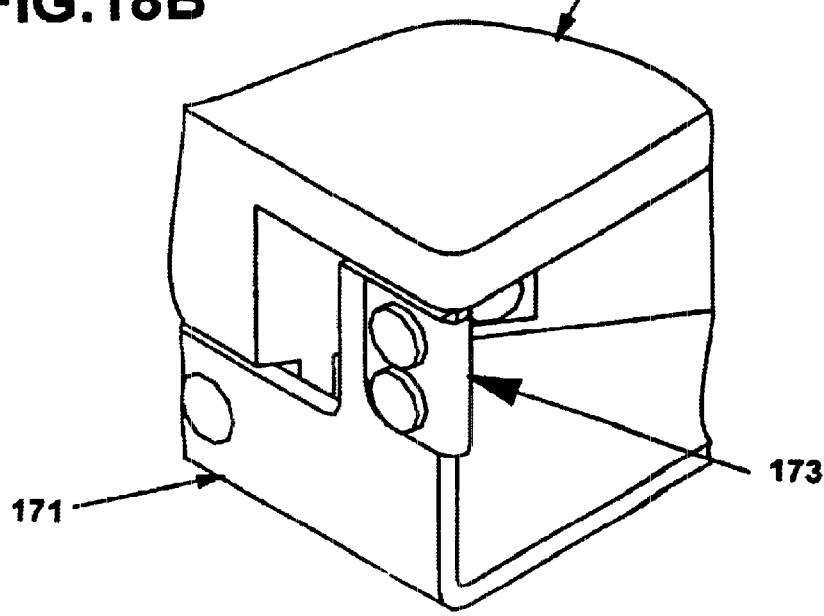
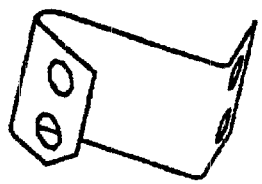
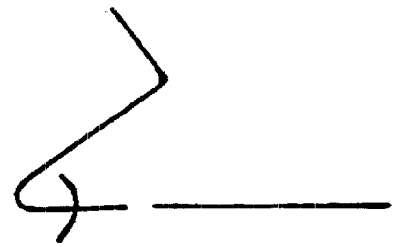

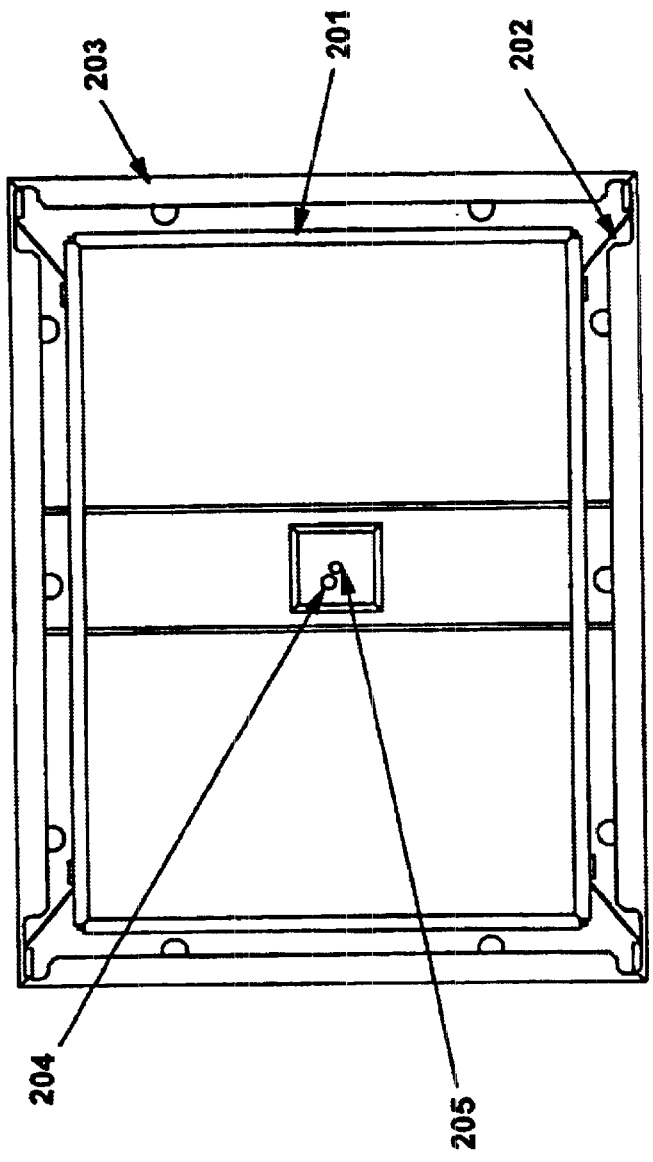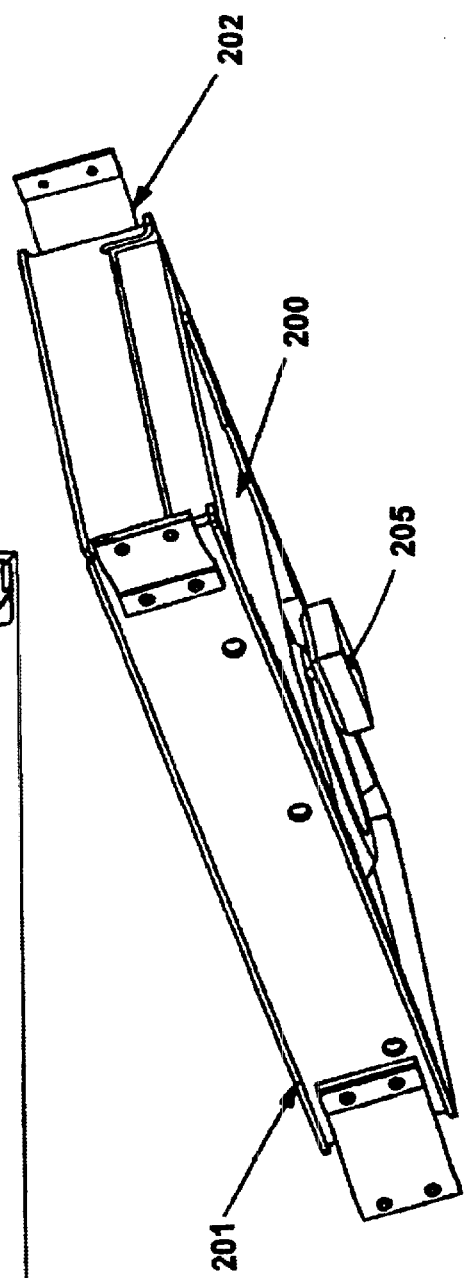

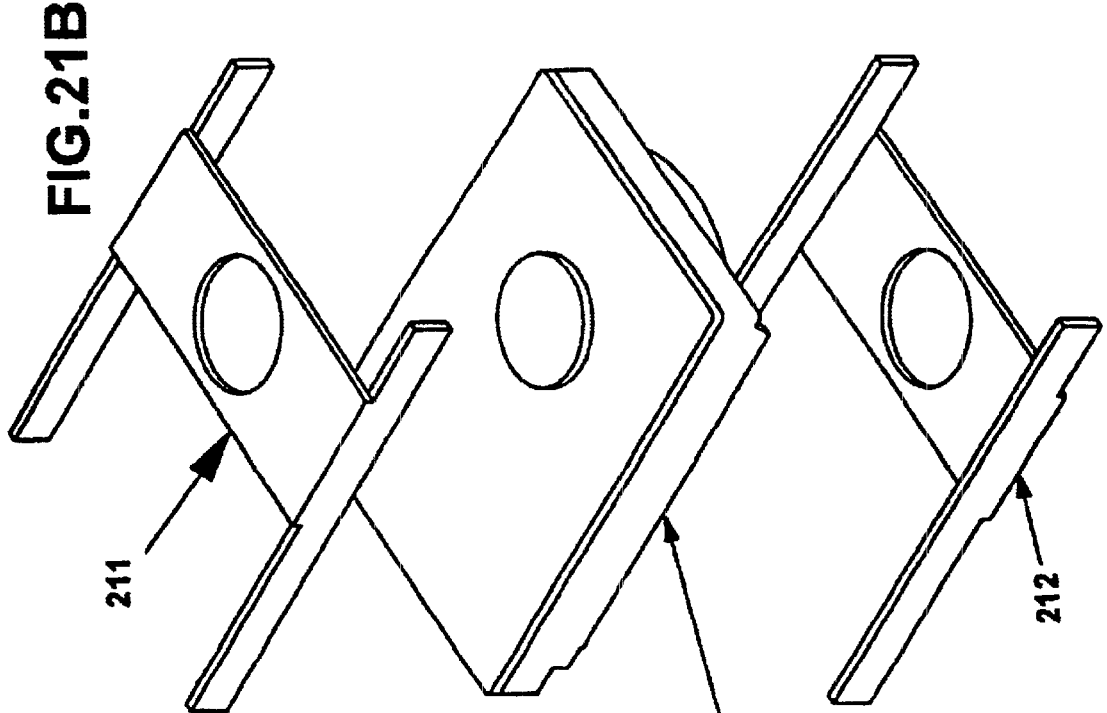
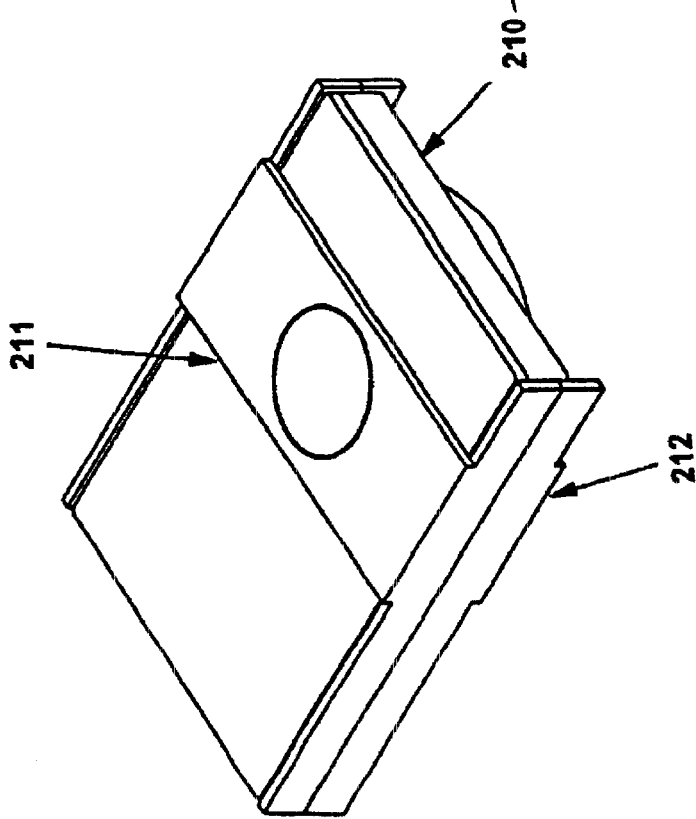

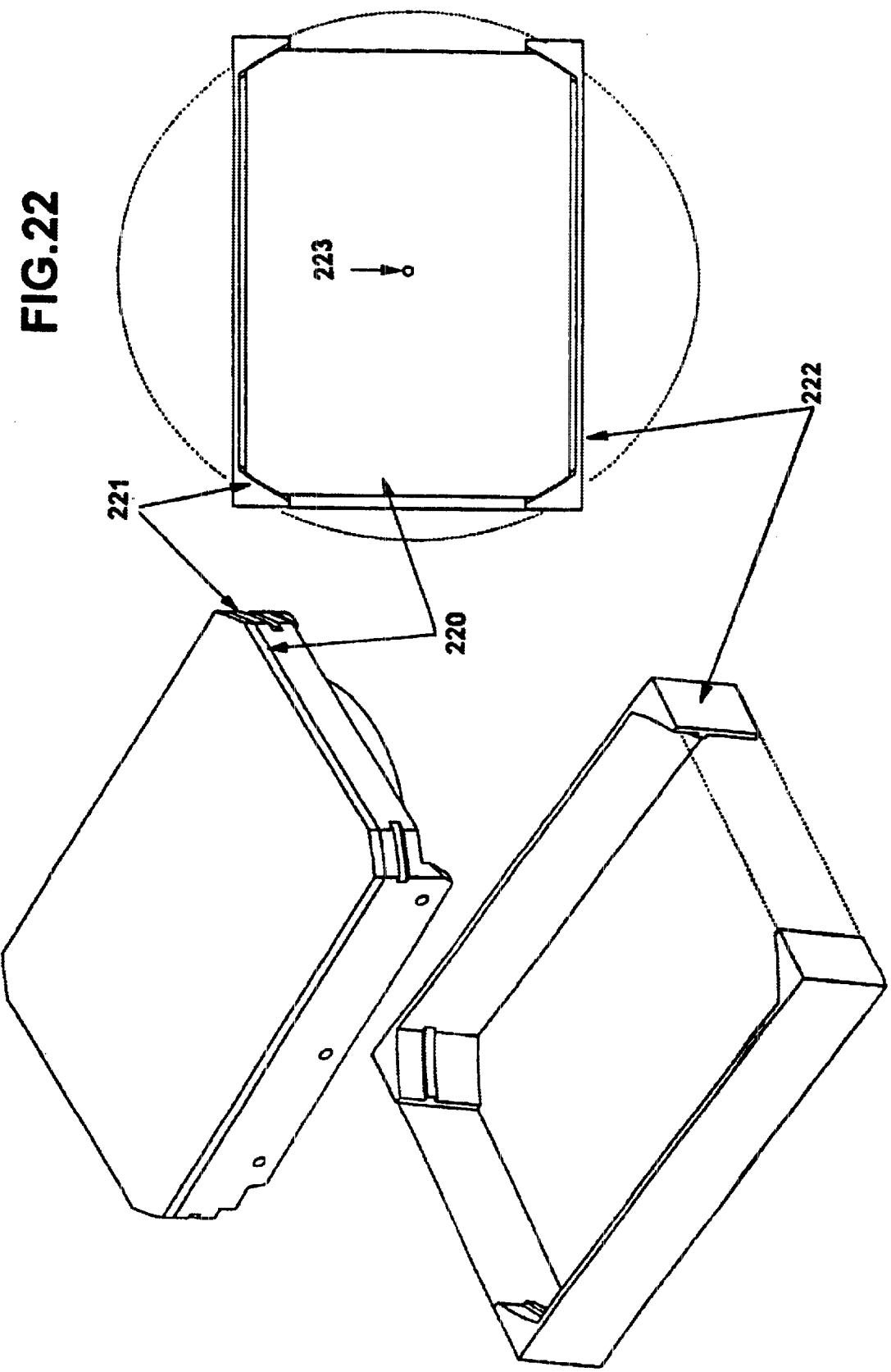

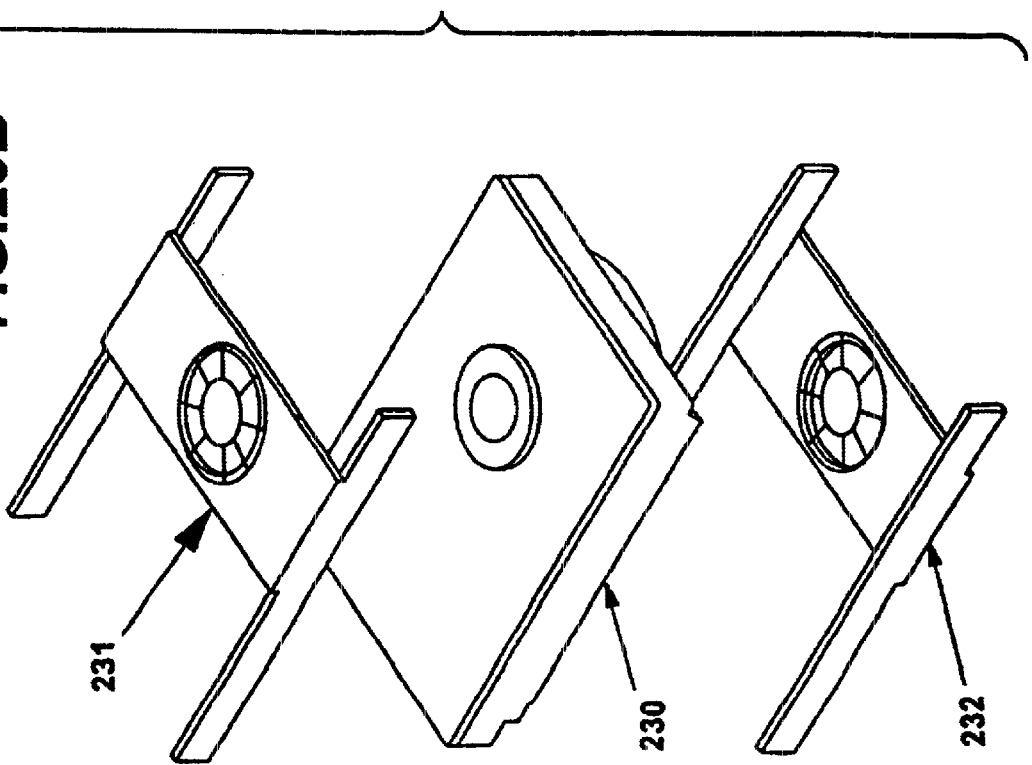
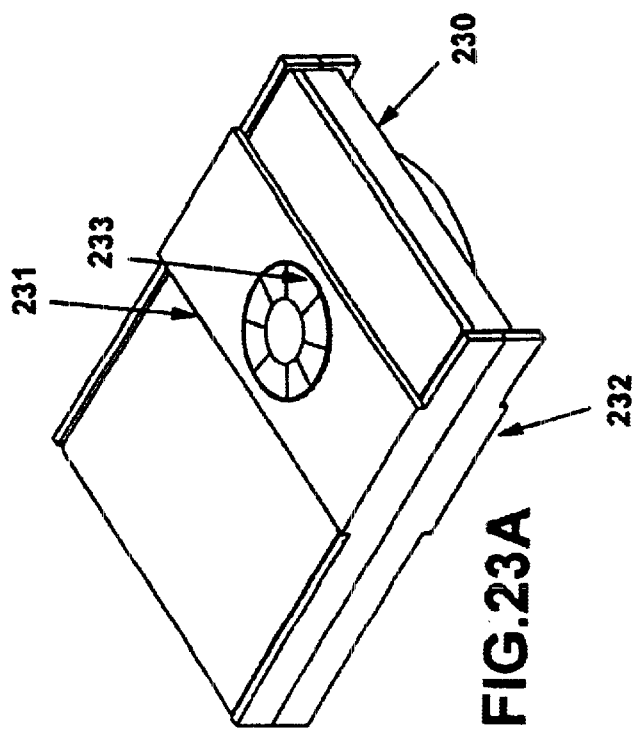

Out-of-Form-Factor

In-Form-Factor

Slots

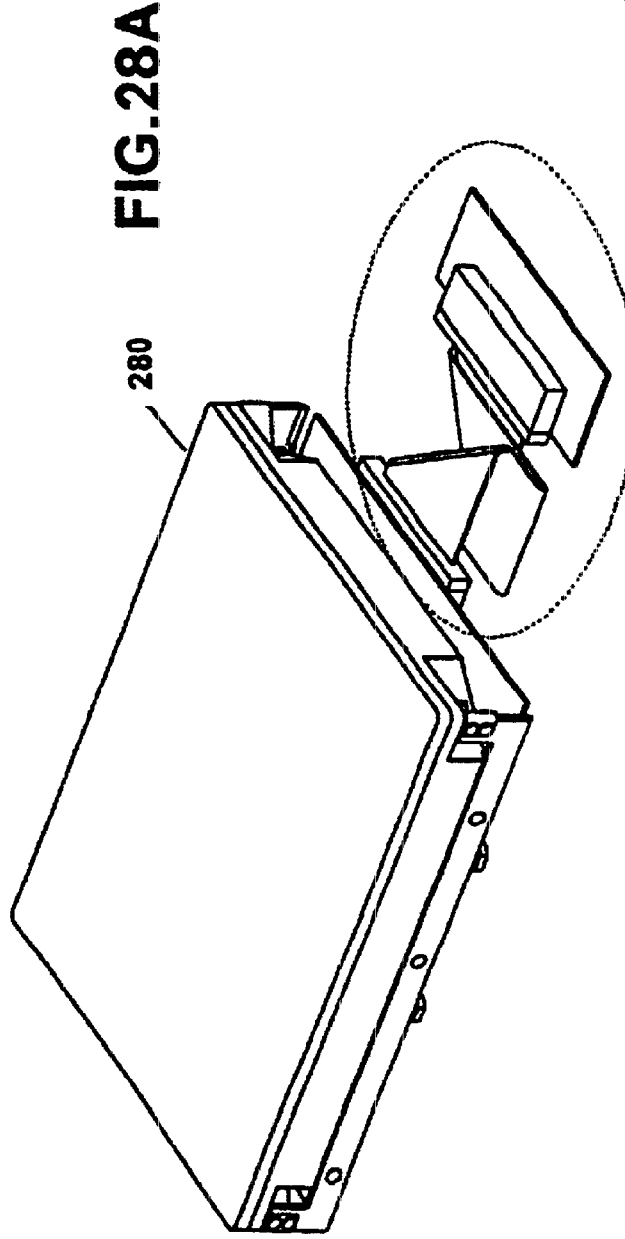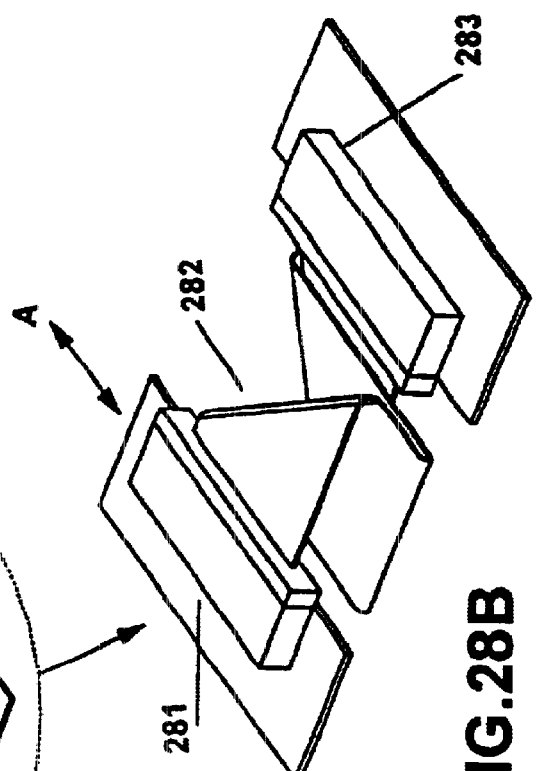

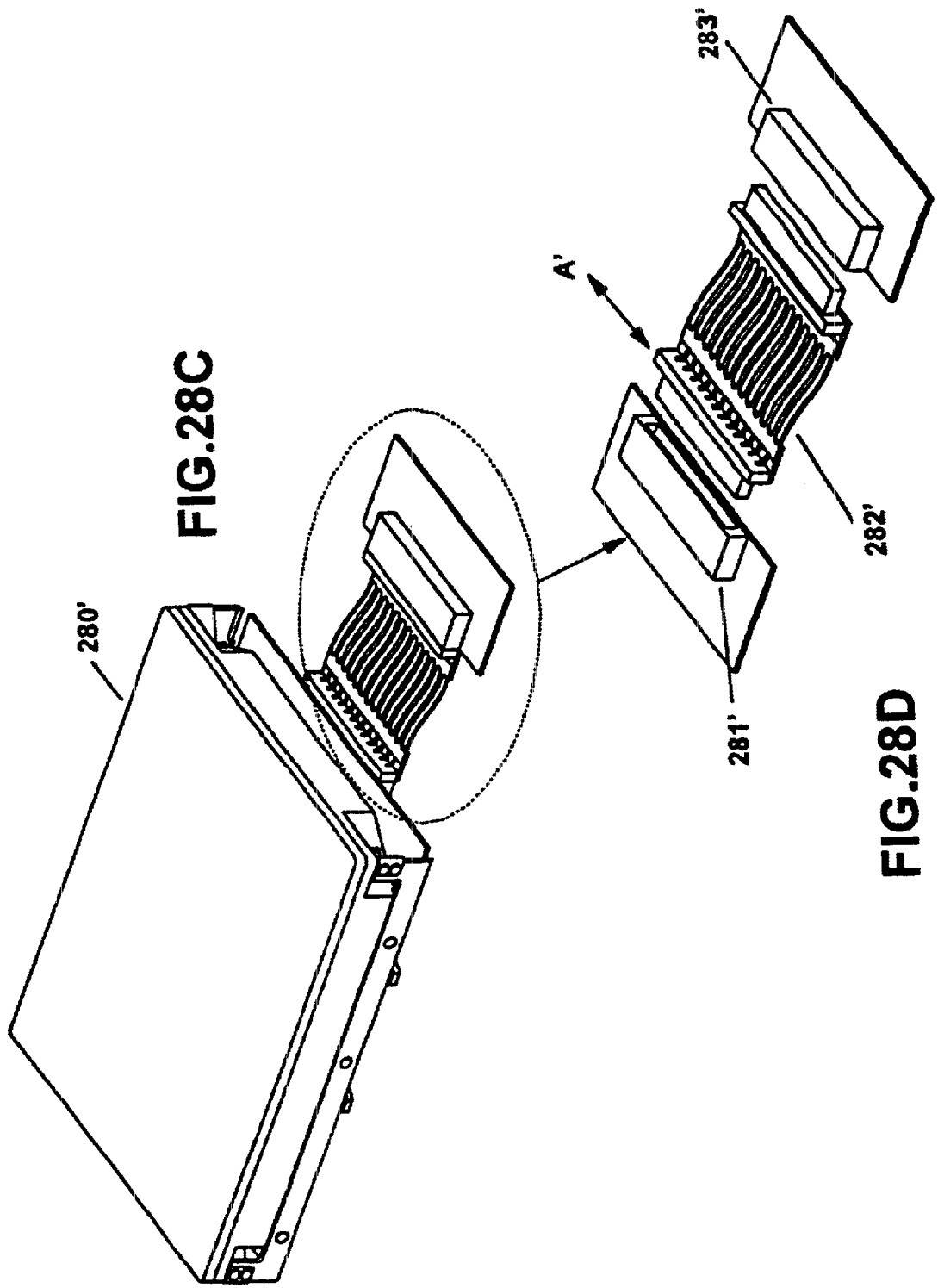

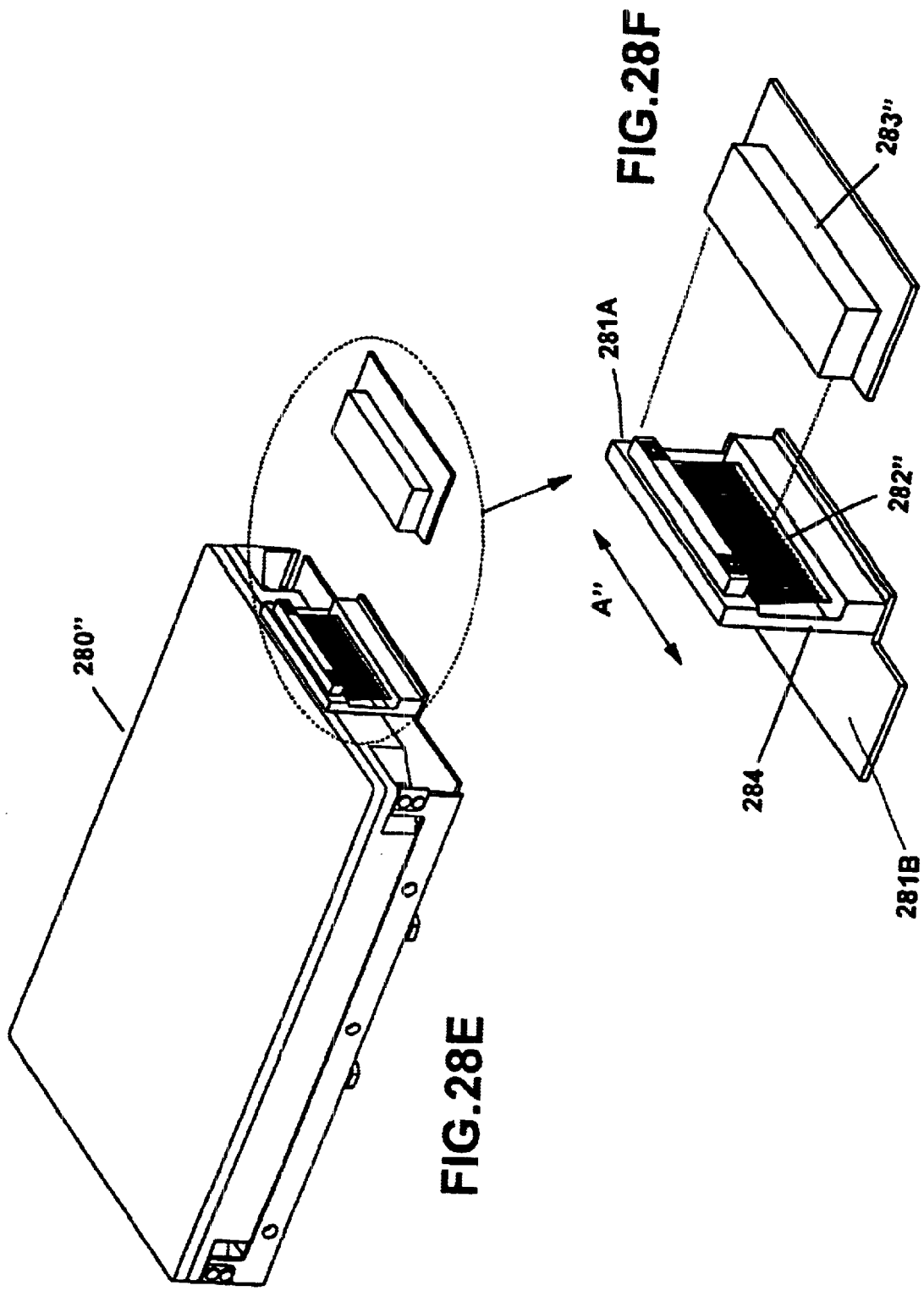

ROTATIONALLY FREE MOUNT SYSTEM FOR DISK DRIVE HAVING A ROTARY ACTUATOR

BACKGROUND OF THE INVENTION

1. Field of the Invention

The present invention generally relates to a disk drive, and more particularly to a disk drive with a rotary actuator-based positioning mechanism, mounted so that it can rotate freely about an axis normal to the plane of actuator motion.

2. Description of the Related Art

As track density continues to grow, the vibration-induced track following error component is expected to become even more critical to the operation of a disk drive. To achieve the expected future demand of 20 Gbits-per-sq. inch areal density, a track density of 50 thousand tracks per inch (kTPI) is needed compared to the present 20 kTPI design point.

However, at high TPI (e.g., above 20 kTPI), the in-plane (theta coordinate) rotational vibration of a disk drive, henceforth referred to as "theta-dynamics", will emerge as a dominant track misregistration (TMR) component. This is because a hard disk drive (HDD) with a rotary actuator system is highly sensitive to in-plane rotational vibration of its baseplate. A solution to the vibration challenge can be developed along several disciplines, ranging from novel mount systems to sophisticated servo algorithms. However, prior to the present invention, none has been satisfactory, let alone optimal.

A computer system may include one or more disk drives where each drive contributes to the total vibration environment. In addition, the computer system itself may be subjected to external seismic excitations. Head positioning accuracy in a disk drive is prone to both self-generated vibration and to vibration generated by another disk drive or other peripherals attached to the same mounting structure. A disk drive with a rotary actuator mechanism produces self-vibration due to mechanical motion resulting from: 1) spindle mass imbalance producing a periodic vibration of the baseplate; and 2) actuator seek reaction torque producing transient dynamics of the baseplate.

These two components (e.g., spindle mass imbalance and actuator seek reaction torque) also produce vibration of the computer chassis which in turn affects other storage devices attached to the same chassis. This effect is referred to as "emitted vibration." Likewise, the drive of interest is subject to "emitted vibration" produced by the neighboring units/drives which can be viewed as an externally-imposed vibration component.

Hence, a solution to three vibration challenges (e.g., self-generated vibration, external vibration, and emitted vibration) is mandatory for a high performance computer storage configuration. Hitherto the present invention, such a solution has not been found.

Further, it is noted that the present generation of 2.5" and 3.5" hard disk drives (HDDs) are designed to operate in portable and desk-top/server environments, respectively. To reduce cost and weight of a computer system, manufacturers typically fabricate the HDD mounting frame utilizing thin structural members. Therefore, a computer frame is a compliant object which makes it susceptible to vibration. Such a mounting configuration makes a disk drive vulnerable to vibrations excited by internal or external sources. A head positioning servo system in an HDD performs three critical tasks. First, it moves the head to the vicinity of a target in a minimum time using a velocity servo under a seek mode. Next, the servo system positions the head on the target track with minimum settle-out time using a position controller without an integrating term in it. Finally, the servo system enters the track-follow mode with a proportional-integral-derivative-type (PID) position controller. During the seek mode, maximum rotational acceleration torque followed by a deceleration torque is imparted by a voice coil motor (VCM)-based actuator. The corresponding reaction torque on the baseplate causes transient rotational vibration that can be detrimental to the positioning accuracy of the read/write heads.

Present 3.5" disk drives have reached 20 kTPI, and after year 2000 it is expected to grow beyond 25 kTPI. As mentioned above, a major obstacle to raising the track density is inadequate head positioning accuracy in the presence of vibration disturbances. Due to exponential growth in TPI, positioning the read/write elements over a track has become a major challenge. Conventional servo control system requires continuous innovations to perform well under increasingly difficult operating conditions.

It is noted that the mechanical components such as spindle motor assemblies are not perfectly mass-balanced, and during operation they produce harmonic vibration. Harmonic vibration excitation produces both a linear and a rotational oscillatory motion of the whole HDD system. At a 15 kTPI design point, a rotational oscillatory motion of a track with respect to the actuator pivot of about 0.01 thousandth of an inch (e.g., about 0.25 micrometer) corresponds to 15% of the track pitch. When not compensated, a track following error of 15% of track pitch can be detrimental to a disk drive's "soft" and "hard" error rate performance. The positioning error due to this internally-produced periodic vibration can be solved using a servo method proposed in U.S. Pat. No. 5,608,586, incorporated herein by reference.

By using special shock and vibration isolation mount design, the rotational oscillatory components due to internal spindle forcing can be minimized as disclosed in U.S. Pat. No. 5,400,196, incorporated herein by reference.

However, a mount design optimized to decouple internal spindle vibration as covered by U.S. Pat. No. 5,400,196, incorporated herein by reference, remains susceptible to external input vibration. By deploying the isolation mounts along a polygon satisfying a particular set of criteria defined by Japan Patent No. 2,565,637, incorporated herein by reference, the external vibration inputs generating rotational vibration on an HDD can be minimized. In co-pending U.S. patent application Ser. No. 09/119,184 (now US Patent No. 6122139)commonly assigned , a method of neutralizing the reaction by generating a counter torque using a secondary actuator was proposed.

However, these above-mentioned methods are deficient in that each solves only a subset of the three vibration challenges of an HDD, and none of them provides a simple, low-cost solution to the seek-induced transient dynamics. Thus, an HDD with a novel mounting frame that is more robust against vibration can yield a competitive product, but hitherto the present invention, such a problem has not been recognized, nor has a structure effectively addressing such a solution been developed.

Using sensors, servo algorithms, and inertial force generators, undesirable vibration of a mechanical device, such as an HDD, can be controlled. Previously, using shock isolating rubber mounts, storage devices have been protected from linear shock input. However, due to sway, space requirements, and gradual improvements in shock enhanced storage component design, explicit shock isolation of disk drives has no longer been pursued by manufacturers. Removal of traditional shock and vibration isolation mounts (e.g., see U.S. Pat. No. 5,349,486) was further accelerated by dynamic problems encountered during the operation of a drive (e.g., see U.S. Pat. No. 4,967,293). Since 1990, the storage industry has moved away from shock isolation design. In today's market, it is believed that no disk drive is manufactured with a shock and vibration isolation system. Previously, use of a shock isolation system protected an HDD from shock handling, but it actually degraded the linear vibration problem as well as the settle-out problem. Further, traditional isolation systems use damping materials that are not good heat conductors.

Thus, in view of all of the foregoing problems, hitherto the invention, there has been no system in which the plurality of vibrational components have been effectively compensated and in which a seek induced settle-out dynamics problem has been solved using a unique rotational mount concept.

SUMMARY OF THE INVENTION

In view of the foregoing and other problems, disadvantages and drawbacks of the conventional systems and methods, an object of the present invention is to provide a structure and method for effectively compensating for the three vibrational components (e.g., self-generated vibration, external vibration, and emitted vibration) to provide a high performance computer storage configuration.

Another object of the present invention is to provide a structure and method for a disk drive, with rotary actuator-based positioning mechanism, to be mounted so that it can rotate freely about an axis normal to the plane of actuator motion.

In a first aspect of the present invention, a disk drive (and method) includes a system for mounting a hard disk enclosure (HDE), including a casing pivotably mounted to minimize settle-out dynamics, external rotational vibration, and emitted vibration, the casing allowing the HDE to rotate substantially freely, wherein the center of gravity of the HDE is substantially the same as a pivot point of the casing.

In a second aspect of the present invention, a disk drive assembly for mounting to a computer chassis, includes a hard disk enclosure (HDE) containing at least one disk and an actuator, and a drive frame including an inner frame for receiving the HDE and having at least one theta-mount provided on the inner frame, and an outer frame for mounting to the computer chassis.

In a third aspect of the present invention, a disk drive with a rotary actuator-based positioning mechanism, mounted so that it can rotate freely about an axis normal to the plane of actuator motion, includes a casing pivotably mounted to minimize at least one of settle-out dynamics, external rotational vibration, and emitted vibration, the casing allowing the HDE to rotate substantially freely, wherein the center of gravity of the HDE is substantially the same as a pivot point of the casing.

In a fourth aspect of the present invention, an apparatus for use with a mechanism that creates rotational torque, includes a casing pivotably mounted to minimize at least one of settle-out dynamics, external rotational vibration, and emitted vibration, the casing allowing the HDE to rotate substantially freely, wherein the center of gravity of the HDE is substantially the same as a pivot point of the casing.

In a fifth aspect of the present invention, a computer chassis, includes a housing, at least one disk drive assembly for being housed. by the housing, and a plurality of theta-mounts integrally built within the housing.

In a sixth aspect of the present invention, a computer chassis, includes a housing, and a plurality of theta-mounts integrally built within the housing.

As shown in FIG. 1, a rigid body motion can take place along three linear (e.g., X, Y, Z) and three angular (e.g. $\Phi$, $\Theta$, $\Psi$) coordinates. The novel mounting system provides sufficient angular rotational freedom along the theta coordinate while it constrains the disk drive along all other five (5) coordinates. No substantial linear or angular freedom of motion along the remaining 5-coordinates is allowed by the mount. FIG. 1 also illustrates the sources of vibration including external vibration, spindle vibration (imbalance), base plate rotation vibration (which is a primary problem), and voice coil motor (VCM) center of gravity (CG) offset, which creates a disturbance torque.

The maximum needed amplitude of rotational freedom is about 300 times smaller than the angle an actuator rotates in a typical 3.5" drive. This would amount to about a 0.1 degree rotational angle. The pivotal axis of the baseplate rotation must pass through the center-of-gravity of the rotationally free disk drive hardware, to eliminate external linear vibration coupling into theta motion of the disk drive. Preferably, in the invention, the axis of rotation of the spindle motor must coalesce with the-pivotal axis of the baseplate to minimize the harmonic excitation of the baseplate due to spindle mass imbalance. (The actuator is assumed to be mass-balanced about its own pivotal axis.)

The rotational freedom for the baseplate mount is realized using either a simple conventional bearing system, a group of flexures, a group of bearings, or a combination of these elements. The mount system can be an integral part of a disk drive, or it could be provided as a part of the computer mounting structure (e.g., as a portion of the computer chassis itself).

With the unique and unobvious features of the invention, the three vibrational challenges of an HDD are solved, in a simple, low-cost solution to the seek-induced transient dynamics. Moreover, the novel mounting frame is more robust against vibration. That is, the invention provides a system in which a seek induced settle-out dynamics problem has been solved using a unique rotational mount concept by effectively compensating for the three vibrational components (e.g., self-generated vibration, external vibration, and emitted vibration) to provide a high performance computer storage configuration.

Additionally, thermal and acoustic characteristics can be controlled by choosing appropriate material, geometry and location of the bearing system. Further, as mentioned above, traditional isolation systems use damping materials that are not good heat conductors. The invention preferably replaces rubber-like material with metallic flexural elements, thereby enhancing heat transfer properties.

BRIEF DESCRIPTION OF THE DRAWINGS

The foregoing and other objects, aspects and advantages will be better understood from the following detailed description of preferred embodiments of the invention with reference to the drawings, in which:

FIG. 3 illustrates

FIG. 8 illustrates a practical theta-mount design;

FIGS. 16(a) and 16(b) respectively illustrate emitted vibration with and without a theta-mount;

FIG. 18(a) illustrates an isometric view of an in form factor flexure-based theta-mount and FIG. 18(b) illustrates the details of the flexure and the mount shown in the dotted-line circle of FIG. 18(a);

FIGS. 19(a) and 19(b) illustrate a side view and a perspective view of the flexural elements used for an in-form-factor theta-mount;

FIGS. 20(a) and 20(b) respectively illustrates a plan view and a perspective view of a flexure-based theta-mount constrained by a pivot bearing;

FIGS. 21(a) and 21(b) respectively illustrate a perspective view and an exploded view of a theta-mount with top and bottom pivot bearing supports;

FIG. 22 illustrates a theta-mount with a distributed bearing system;

FIGS. 23(a) and 23(b) respectively illustrate a perspective view and an exploded view of a flexured theta-mount for maximum spindle heat removal;

FIGS. 28(a) and 28(b) respectively illustrate an exemplary connector configuration for a theta-mount, with FIG. 28(b) showing the detail of the connector shown in FIG. 28(a);

FIGS. 28(c) and 28(d) respectively illustrate a second exemplary connector configuration for a theta-mount, with FIG. 28(d) showing the detail of the connector shown in FIG. 28(c);

FIGS. 28(e) and 28(f) respectively illustrate an exemplary connector configuration for a theta-mount, with FIG. 28(f) showing the detail of the connector shown in FIG. 28(e)

DETAILED DESCRIPTION OF PREFERRED EMBODIMENTS OF THE INVENTION

Figure 1:
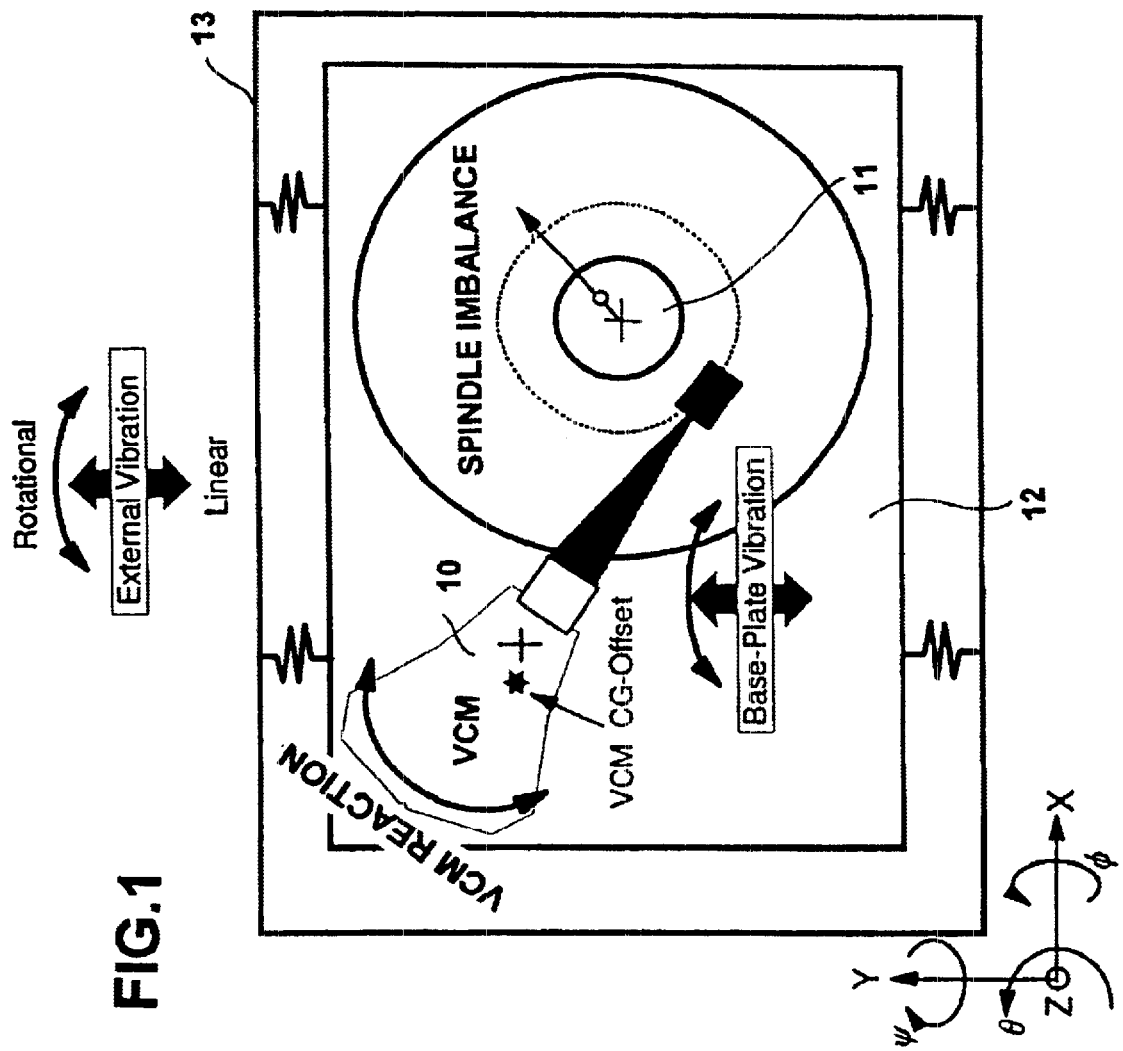
FIG. 1 illustrates sources of vibration affecting a disk drive.

Referring now to the drawings, and more particularly to FIGS. 1–29(b), preferred embodiments of the present invention will be described hereinbelow.

Preferred Embodiment

Prior to describing the preferred embodiment, it is again noted that various vibration sources and their effect on baseplate vibration are shown in FIG. 1. The actuator 10 generates a reaction torque during a seek. Spindle (e.g., 11) mass imbalance produces a periodic excitation. Both components excite the baseplate 12 to vibrate along X, Y directions as well as along the in-plane angular coordinate theta. In addition, the system mounting frame 13 itself may be subject to externally imposed linear and rotational vibration. The actuator mass imbalance can also contribute to TMR through the torque disturbance produced by the linear vibration of the actuator pivot, but nominally the imbalance amount is negligible. Compliance of the spindle bearing (e.g., not shown in FIG. 1) can also produce undesirable TMR.

Figure 2:
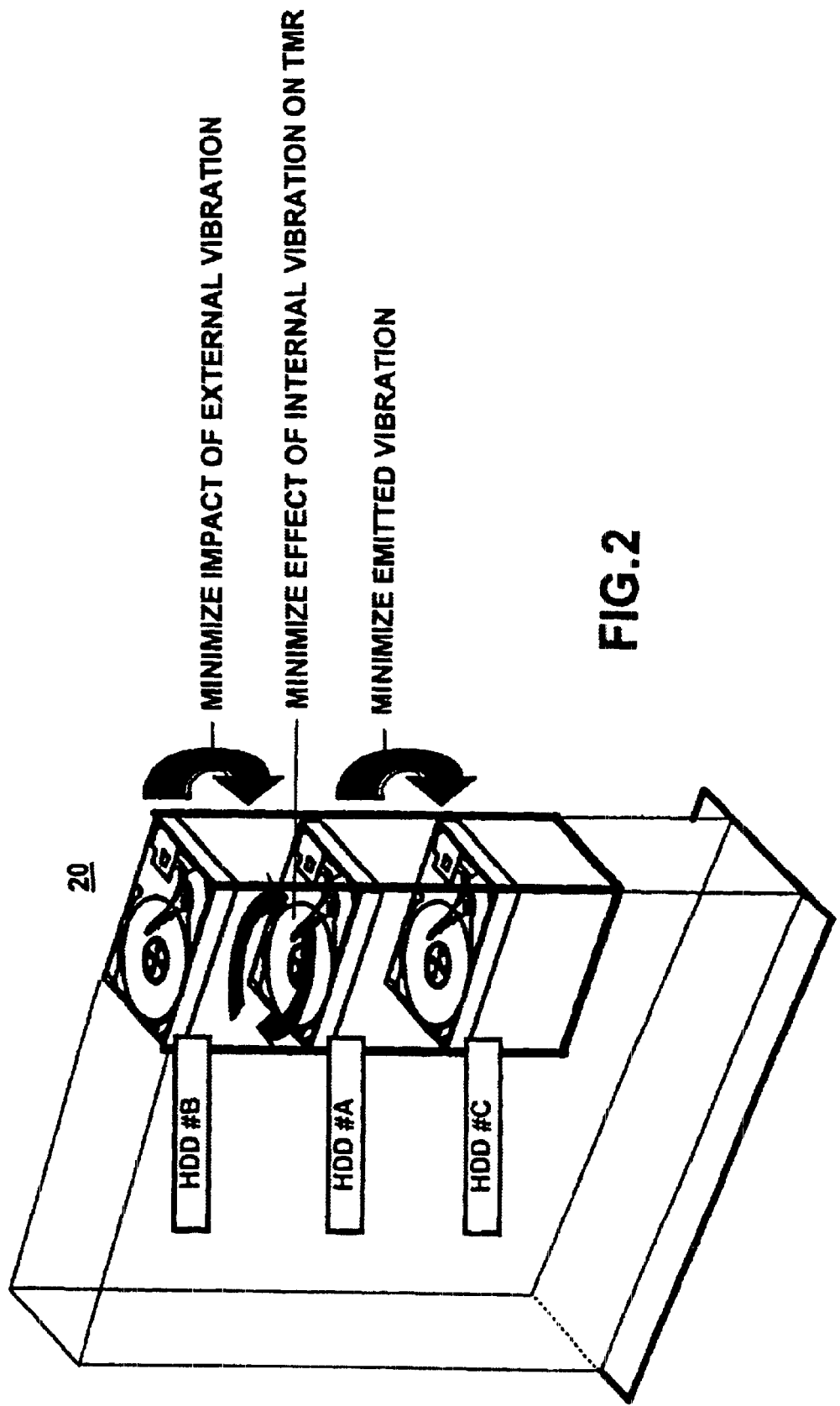
FIG. 2 illustrates a plurality (e.g., three) of major vibrational challenges associated with a disk drive (e.g., A, B, C) in a computer system 20.

FIG. 2 shows the interaction of several drives within a computer system 20. Drive #A is the product (e.g., drive) of interest. Other drives, such as drives #B and #C, impact the performance of Drive #A at the same time they themselves may suffer from the emitted vibration of Drive #A.

A new mount system concept according to the present invention and called a "theta-mount", as discussed in detail below, simultaneously solves the three major vibration challenges found in an HDD (e.g., seek reaction induced rotational settle out dynamics, externally imparted rotational vibration, and emitted rotational vibration).

Figure 3B:
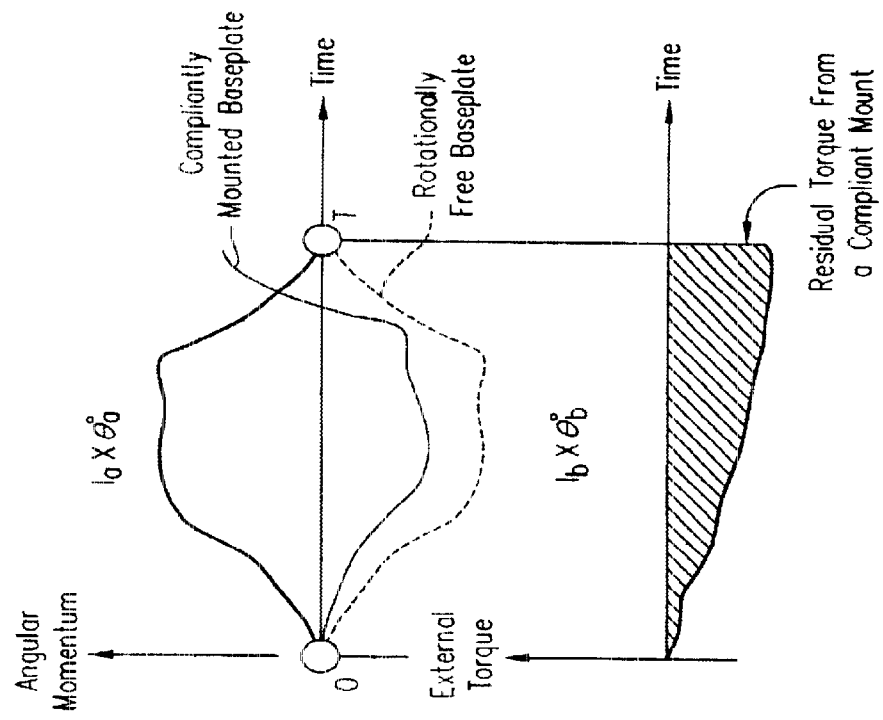
FIGS. 3(a) and 3(b) illustrate the seek dynamics and conservation of angular momentum.
Figure 3A:
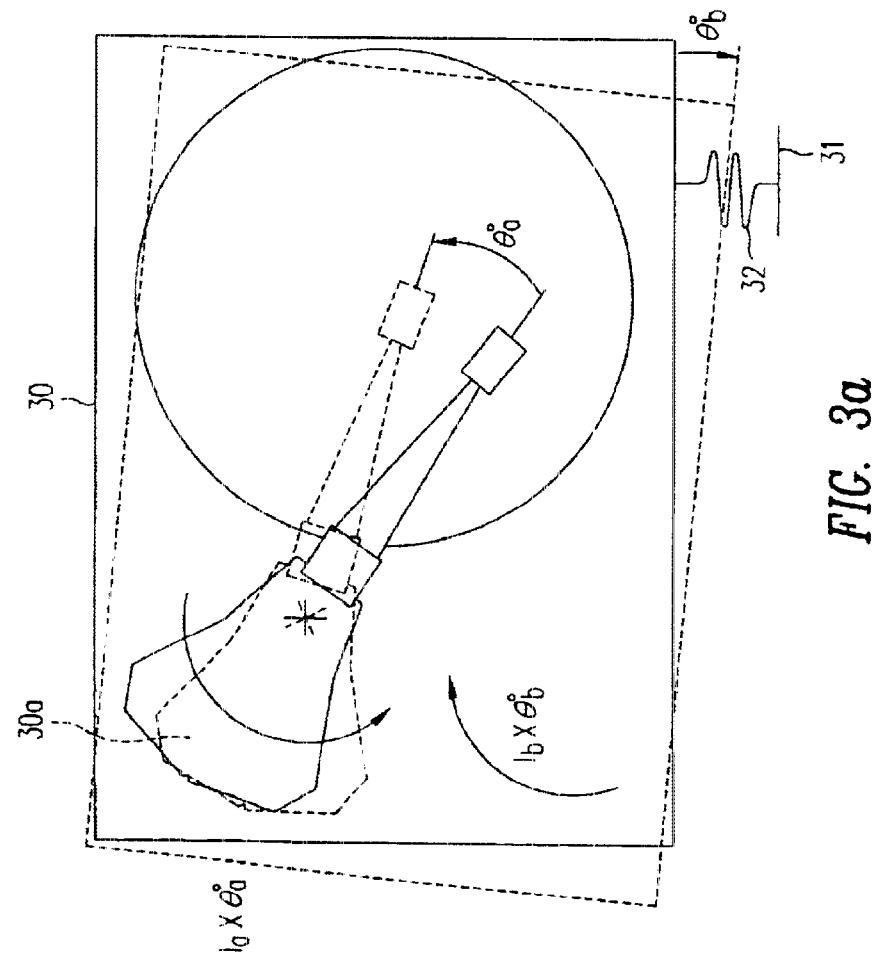

The most difficult to solve problem within the self-induced vibration components is that of seek-induced transient dynamics. FIGS. 3(a) and (b) shows the coupling mechanism that produces transient dynamics of a baseplate 30 (having an actuator 30a mounted thereon) mounted on a compliant computer frame (denoted by a spring 32 attached to a perfectly rigid frame 31). During a seek acceleration phase, the reaction torque drives the baseplate 30 to move against the compliant computer frame in one direction and then during the deceleration phase in a counter direction.

The compliant mount (e.g., spring 32) essentially applies an external torque, thereby contributing to a change in angular momentum of the actuator 30a/baseplate 30 system. Further, the residual torque at the end of a seek further excites the settle-out dynamics of the total system. Thus, even with a complaint mount, there will still be residual torque generated, as shown in FIGS. 3(a) and 3(b). The ensuing dynamics is dictated by parameters such as the baseplate inertia and stiffness of the mounting frame.

It is noted that in the schematic plot, the non-zero torque time history applied during the time interval "T" results in a non-zero angular momentum of the baseplate 30, whereas the torque is identically zero if the baseplate is allowed to rotate freely along the theta coordinate. Thus, in FIGS. 3(a) and 3(b), in practice, due to movement of the base plate, at the end of a seek, a nonzero velocity (e.g., as shown by the graph of FIGS. 3(a) and 3(b)) occurs. This is a primary problem to be solved.

The theta-mount design concept according to the present invention is based on the principle of conservation of angular momentum which states that the net rate of change of angular momentum is proportional to the torque applied. Thus, if no torque is applied to the composite actuator 30a/baseplate 30 system, then there can be no change in net angular momentum.

Figure 4A:
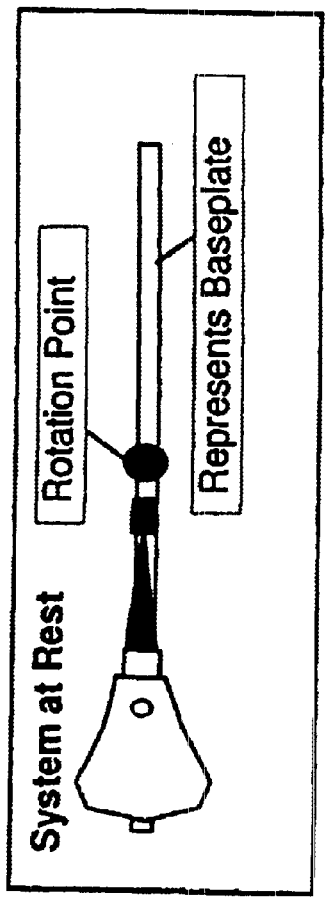
FIGS. 4(a)–4(c) illustrate a mechanism of theta-dynamics with and without a compliant mounting after a seek.
Figure 4B:
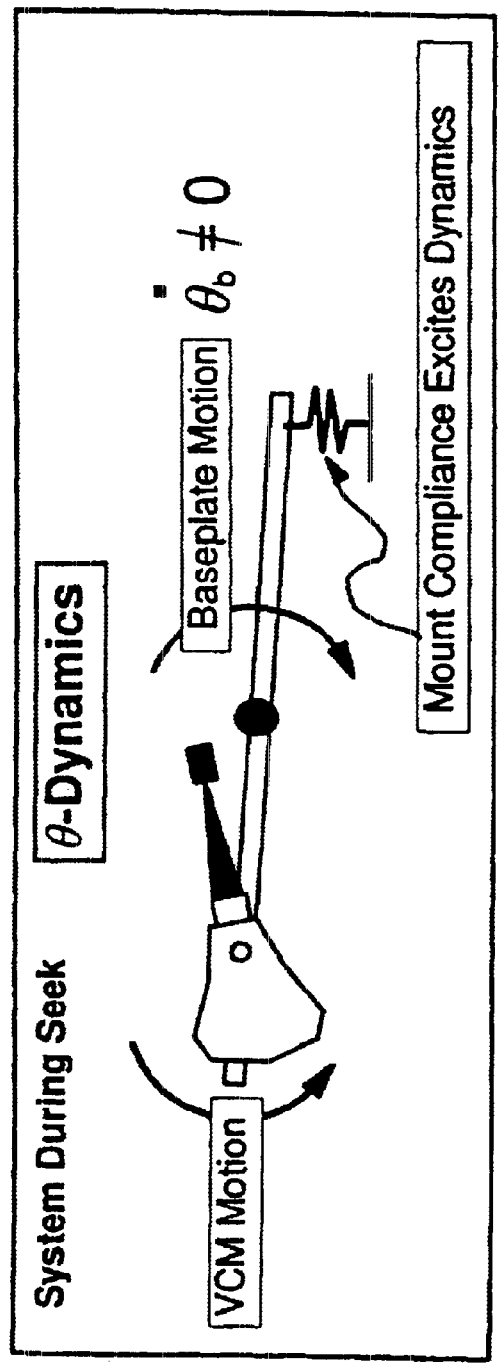
Figure 4C:
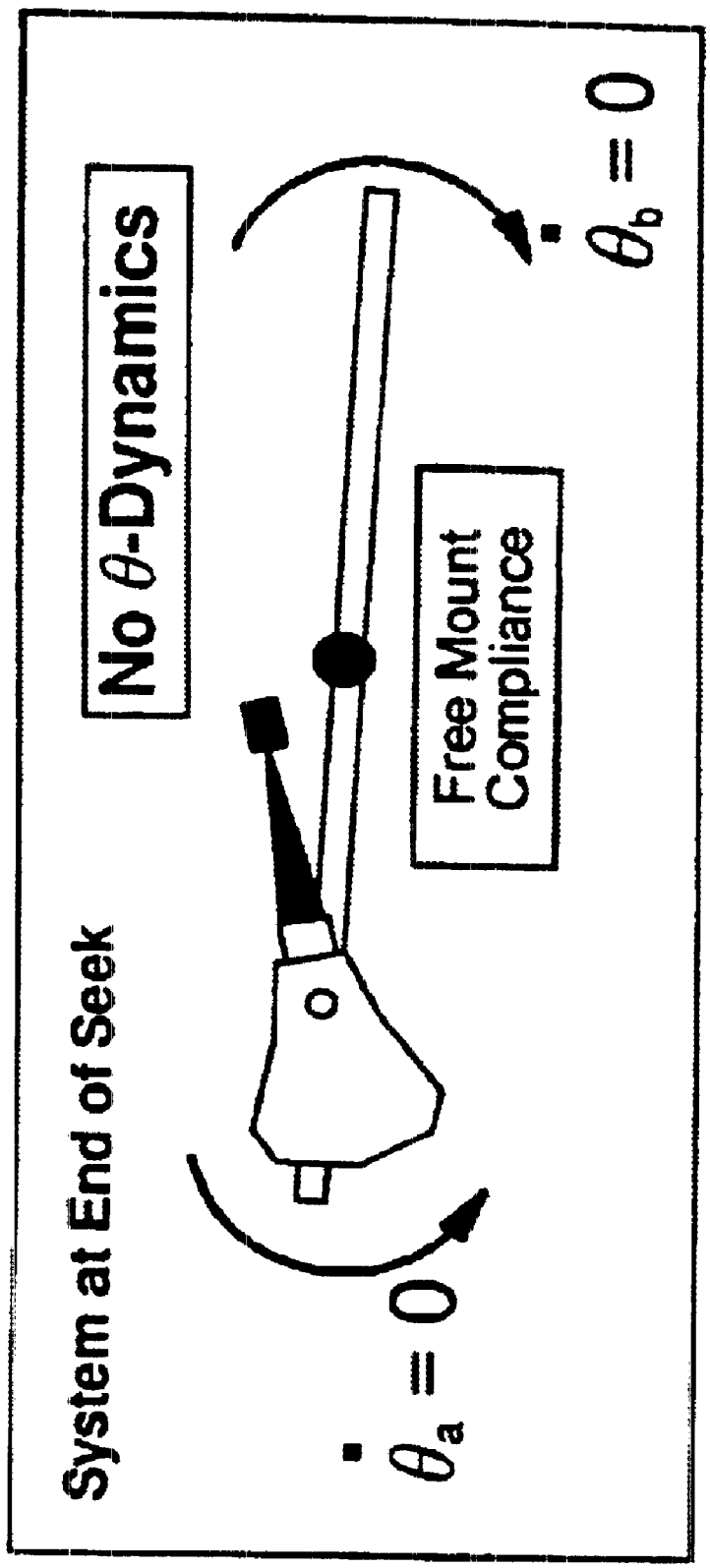

Thus, if an HDD is mounted such that it is allowed to rotate freely in the theta plane, then during and at the end of a seek the combined angular momentum of the actuator 30a and baseplate 30 will remain null since they were not subjected to a net external torque.;

FIGS. 4(a)–4(c) shows a conceptual realization of an ideal "theta-mount" according to the present invention (e.g., how to locate the ideal mounting condition), with the system at rest (FIG. 4(a)), with a compliant system during a seek (FIG. 4(b)), and with a free-mounted (zero compliance) system at the end of a seek (FIG. 4(c)). Thus, FIGS. 4(a)–4(c) show ideal situations and conditions. A practical theta-mount system design employing flexures, as discussed below, achieves near ideal results.

The theta-mount according to the present invention not only solves the primary problem of seek transient dynamics, but also eliminates the remaining two challenges of externally-applied rotational vibration and emitted rotational vibration.

Figure 5A:
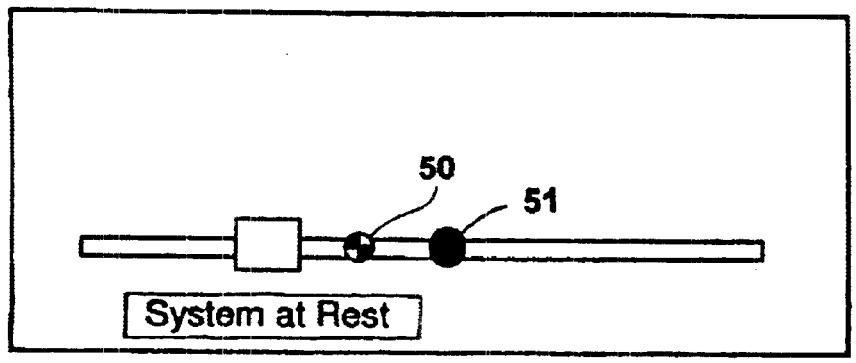
FIGS. 5(a)–5(c) illustrate generation and minimization of rotational vibration due to external linear vibration.
Figure 5B:
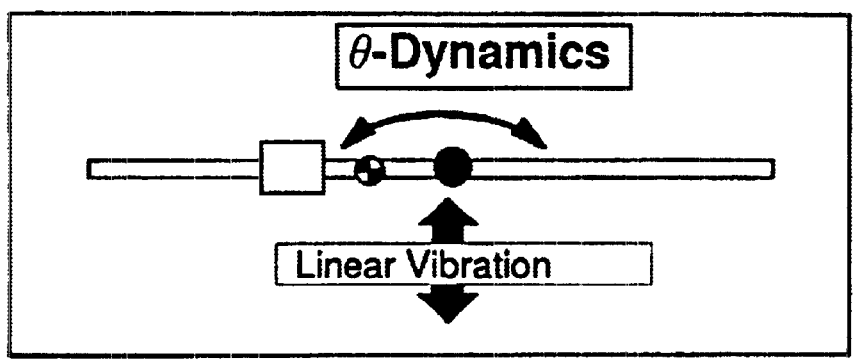
Figure 5C:
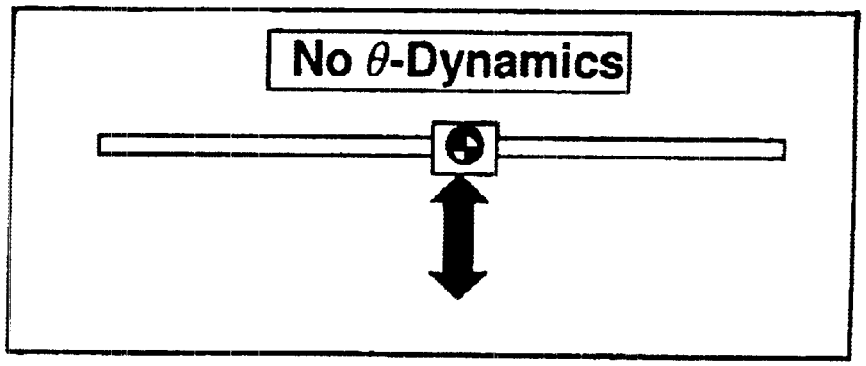

To eliminate external linear vibration coupling into a rotational mode of the baseplate, it is preferable to match the center of gravity (CG) of the disk drive system with the pivot point of the theta-mount, as shown in FIGS. 5(a)–5(c). Thus, FIGS. 5(a)–5(c) are directed towards how to minimize the external linear vibration impact.

That is, in FIG. 5(a), the system is at rest and the CG 50 is offset from the pivot point (e.g., point 51). FIG. 5(b) illustrates the torque generated by the linear vibration due to the CG being offset from the rotation point (e.g., this is the worst condition), whereas FIG. 5(c) illustrates the CG matching the pivot point with no resulting theta dynamics.

Figure 6A:
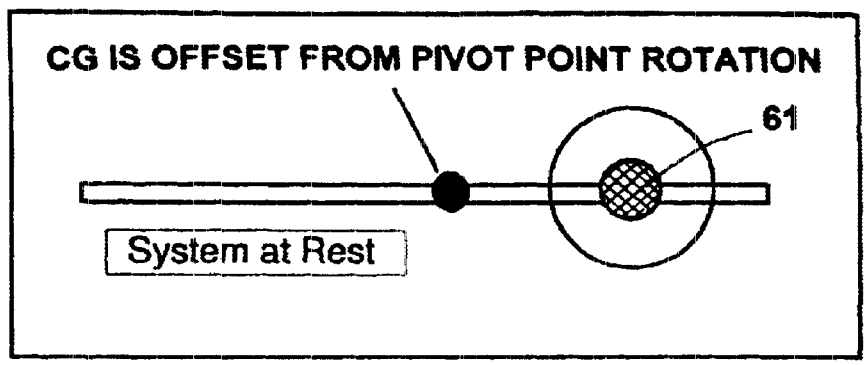
FIGS. 6(a)–6(c) illustrate minimization of spindle mass imbalance-induced rotational vibration.
Figure 6B:
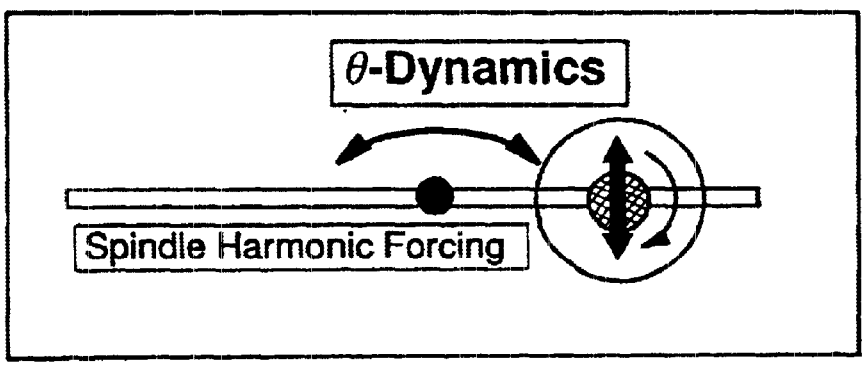
Figure 6C:
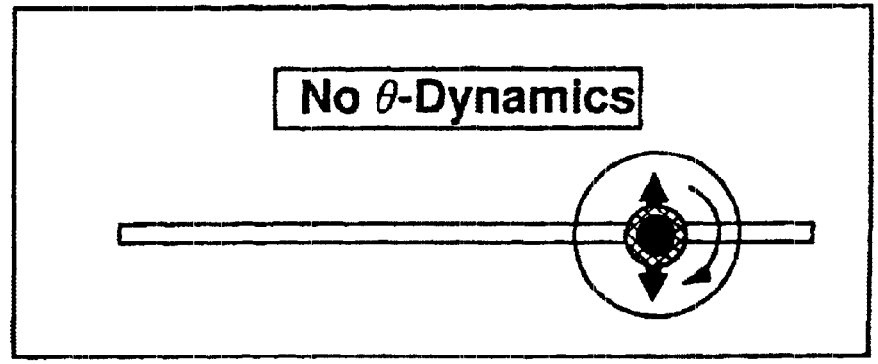

Further, in an ideal design, the spindle rotational axis and the pivot point of the theta-mount must be made to coalesce so that the torque applied to the baseplate about the pivot point, by the spindle motor, is driven to zero. FIGS. 6(a)–6(c) show the harmonic forces as a result of the spindle mass imbalance which cause theta dynamics of the baseplate. FIG. 6(a) shows the pivot axis offset from the spindle rotation axis 61. By minimizing the distance between the axis of spindle rotation and pivot point of the theta-mount (e.g., as shown in FIG. 6(c)), the moment due to harmonic forces can be reduced.

Since mass of the spindle is a substantial component of the total baseplate inertia, the distance between spindle axis and pivot location can be optimized to achieve a practical design. For example, when the distance is zero, the spindle contribution to rotational forcing is minimized but too much of extra mass loading of baseplate may be needed. As the distance between pivot axis and spindle axis increases, the harmonic moment increases linearly, but the contribution of the spindle to the inertia increases as a square of the distance. Hence, making the spindle axis and the CG of the base plate system match minimizes spindle-related problems, but some optimization can be used to trade-off the offset and total inertia of the base plate system.

Figure 7:
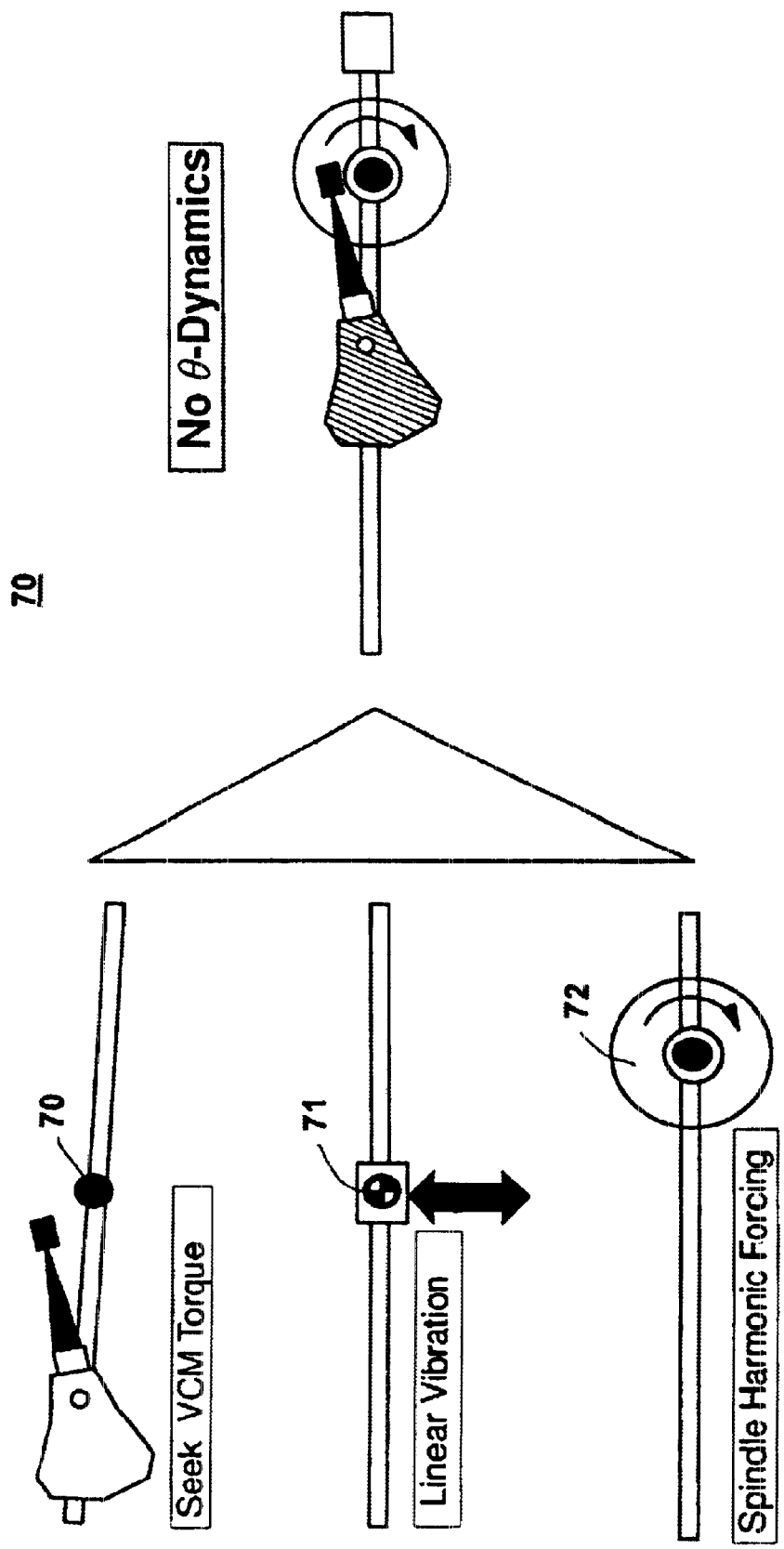
FIG. 7 illustrates an integrated theta-mount design according to the present invention;.

Thus, the best mode realization of a theta-mount concept according to the present invention combines the individual solutions to the three sources of vibration (e.g. shown in FIGS. 4(c), 5(c) and 6(c)) into an integrated design, as shown in FIG. 7, where the center of gravity (CG) 70 of the total moving system (e.g., the "total moving system" for center of gravity represents Spindle+disk+actuator+ baseplate and for rotational inertia includes total system inertia minus the polar moment of inertia of the disk/spindle), the pivot point 71 of the theta-mount and the axis of rotation 72 of the spindle are all designed to be on a single axis. Thus, the spindle preferably rotates at the center of gravity (CG) and at the pivot pin.

FIGS. 8(a)–8(b) show the concept in the context of a real world (e.g., practical) disk drive 80, where the center of gravity 81 of the total system (e.g., disk drive system) is not at the geometric center of the rectangular-shaped baseplate 84, but is located near the spindle axis of rotation.

In FIG. 8(a), a conventional HDD is shown mounted to a mounting plate by means of a rotational bearing or the like. The mounting plate is equivalent to an outer frame which gets attached to a computer frame.

As shown in FIG. 8(b), additional masses 82 may be provided to move the center of gravity towards the axis of rotation (e.g., mass 82 added to control the CG location). A mild spring 83 restores the movable part of the HDD to a neutral position (e.g., provided for centering of the movable part of the HDD). For example, "mild" in the context of the invention may be a spring which provides 20–30 Hz, or less, frequency of oscillation in the theta plane of rotation.

FIG. 8(b) also shows a point "P" at which the spring 83 is attached and defines the corresponding radial and tangential directions. It is noted that when the pivot bearing is ideal, the motion of point P can take place only along the tangential direction.

Figure 9A:
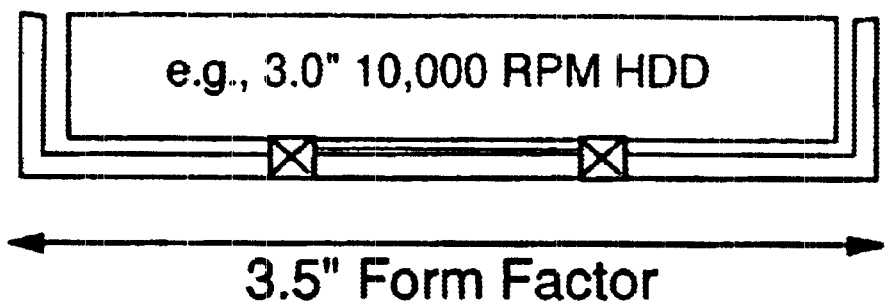
FIG. 9 illustrates a theta-mount for a standard form factor disk drive with smaller (e.g., than the standard form factor) diameter disk platters.
Figure 9B:
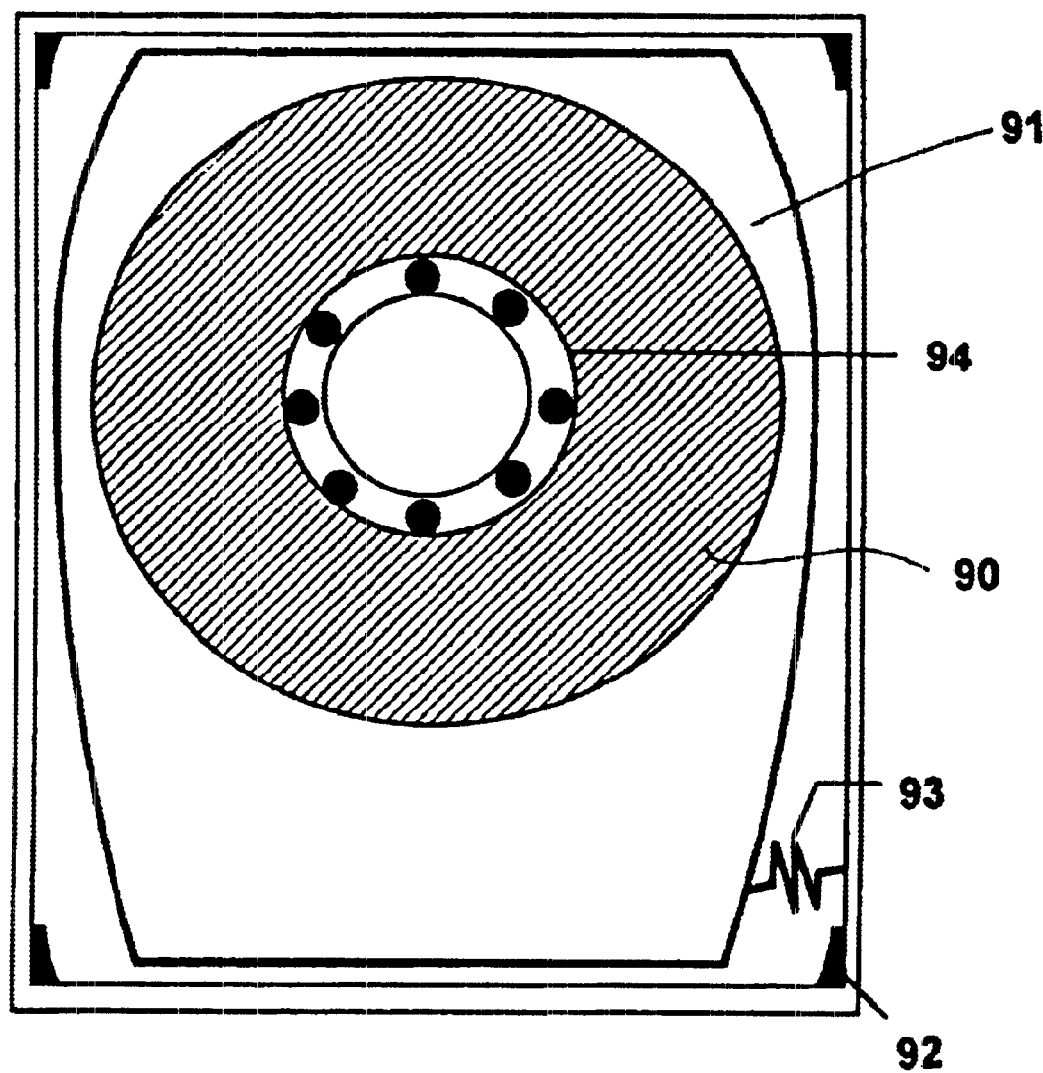

FIGS. 9(a)–9(b) show a design layout where the disk platter diameter is selected to be smaller than a standard form factor disk diameter.

For example, a conventional 95-mm (diameter) disk platter may be replaced by a 70-mm platter 90 in a 3.5" form factor drive for other technical reasons, such as minimizing power or disk-flutter. Under this configuration, there is plenty of space available to accommodate the 0.1 deg. of rotation needed by the baseplate 91.

Therefore, the baseplate geometry can be shaped to remain within the industry standard form factor, while simultaneously providing the required rotational freedom. Since a drive could be subject to rotational shock during the handling process, a set of soft-limiters 92 may be used to constrain the drive's rebounce dynamics, thus avoiding damage due to shocks having a relatively narrow pulse width. Thus, the limiters restrict the large amplitude rotation of the HDD. Further, FIG. 9(b) illustrates a mild spring 93 to restore the neutral position of the HDD (e.g., similarly to the mild spring 83 described above in connection with FIG. 8(b)). Additionally, a single bearing support 94 is shown for the HDD. It is noted that this bearing 94 is distinct from the bearing of the spindle motor itself.

The pivot-point of the theta-mount in the figures discussed above. are assumed to be provided by a conventional bearing. However, the pivoting action can also be provided through a group of flexures or any other known form of bearing technology available to a designer and taking the present specification as a whole.

Alternative Configurations of the Preferred Embodiment

Several alternative configurations of a theta mount according to the present invention are now presented. A standard disk drive with 3.5" form factor is first tested in an externally (out-of-form factor) configured theta-mount, as shown in FIGS. 10(a)–10(d).

Figures 10A, 10B, 10C, 10D:
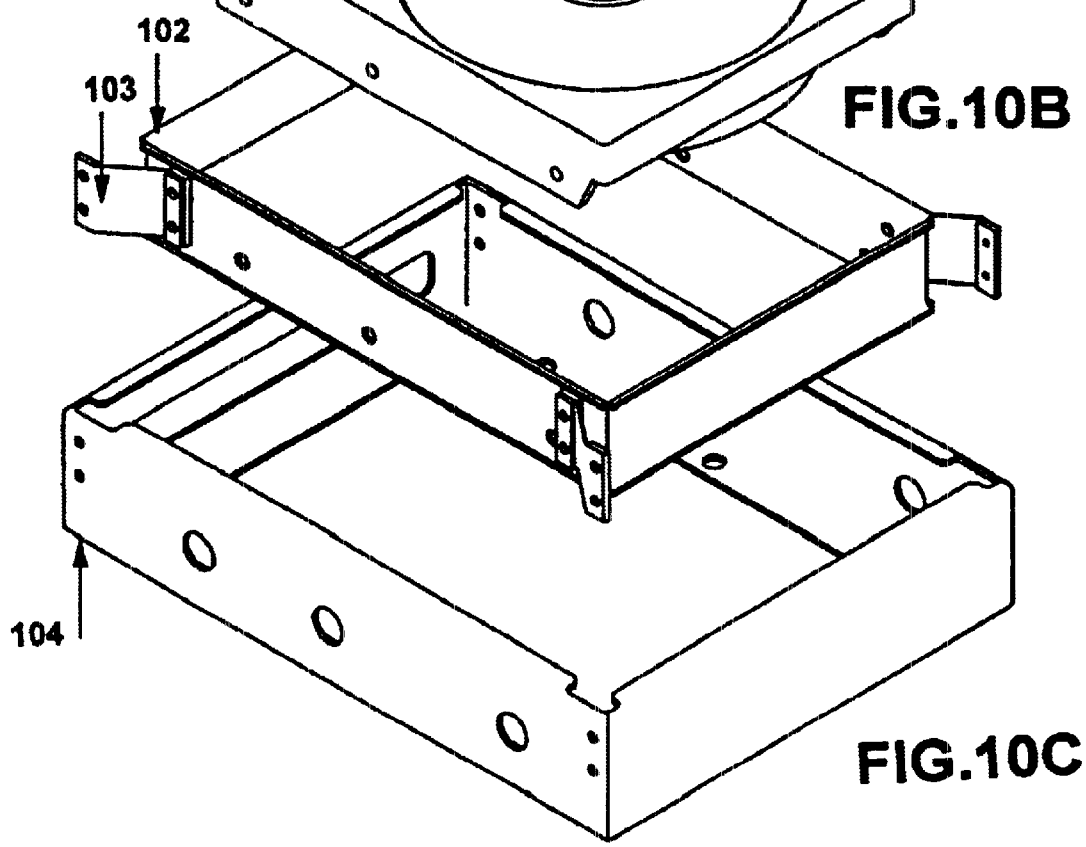
FIGS. 10(a)–10(c) illustrate an exploded view of an out-of-form factor, flexure-based theta-mount.
FIG. 10(d) illustrates a plan view of the same.

As shown in FIGS. 10(a)–10(c), the disk drive assembly is composed of two pieces. That is, a "hard disk enclosure (HDE)" 100 that is protected and contains the disks (not illustrated) and actuator 101, as shown in FIG. 10(a), and the "drive frame" (e.g., as shown in FIGS. 10(b) and 10(c)) including an inner frame 102 for receiving the HDD 100 and having a flexure(s) preferably provided at each side and/or corner of the inner frame, and an outer frame 104 that provides the outer structure that is then mounted to a computer chassis. FIG. 10(d) shows a schematic top view of the theta mount according to the present invention including the HDD 100, the inner frame 102, the flexure 103, and the virtual pivot 105 for the HDD.

Figure 11:
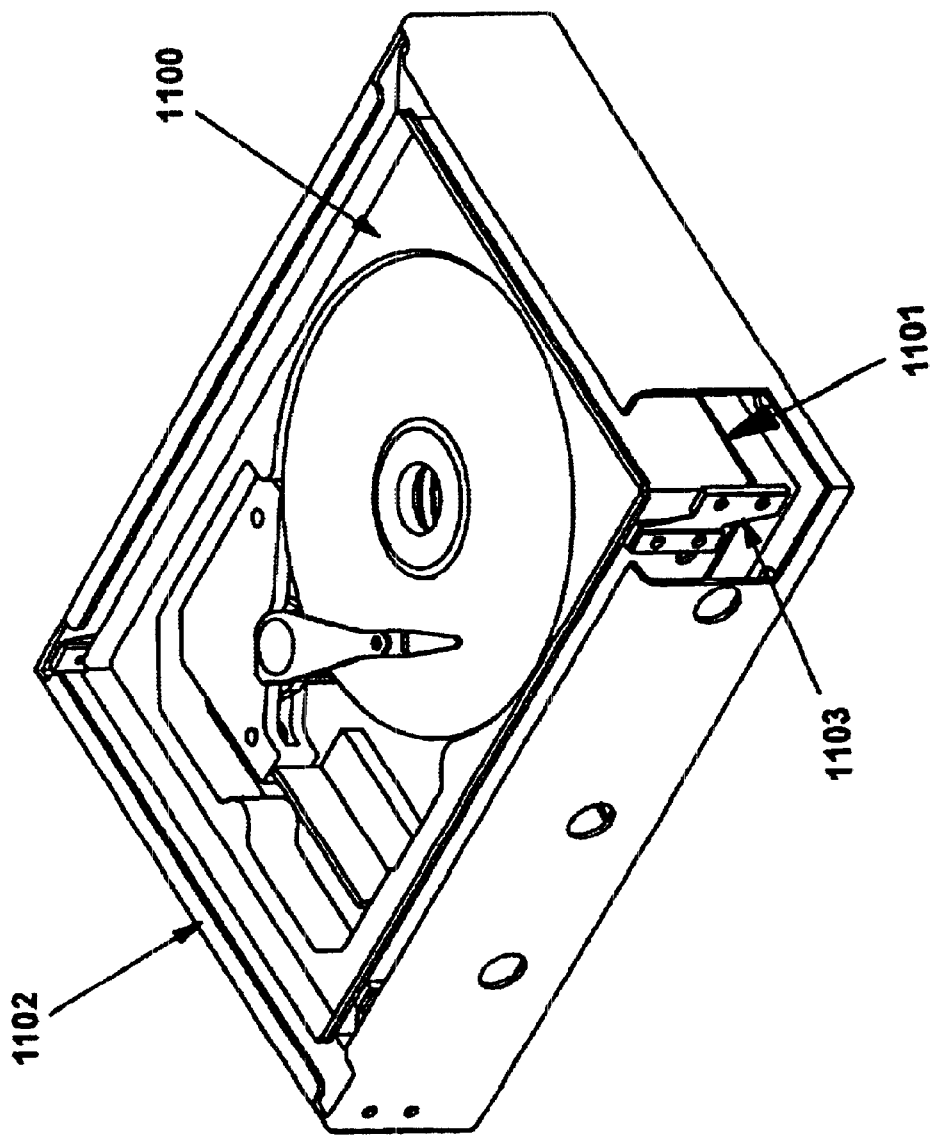
FIG. 11 illustrates an isometric view of an out-of-form factor flexure-based theta-mount with a cover having been removed for clarity.

An isometric view of the assembled system is shown in FIG. 11. The acronym "HDE" is introduced to distinguish the movable (or pivotable) part of an HDD 1100 from the frame and electronics as appropriate. The HDD 1100 is inserted into an inner frame 1101, which in turn is inserted into an outer frame 1102. The mechanical support linking the two parts (e.g., inner frame 1101 and outer frame 1102 can be provided by a number of means. One of the simplest devices includes using flexures 1103, as shown in FIG. 11. In one design, a plurality (e.g., four) metallic flexures can be positioned at the plurality (e.g., four) corners of the drive. More than four flexures, all forming a single virtual pivot point, can be used to improve stiffness along other axes (X, Y, Z, A, T). Flexures can be made of metal or any other material that will provide adequate stiffness along other axes (X, Y, Z, Φ, Ψ).

Figure 12A:
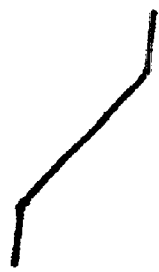
FIGS. 12(a)–12(b) illustrate various views of the flexural elements used for the out-of-form factor theta-mount.
Figure 12B:
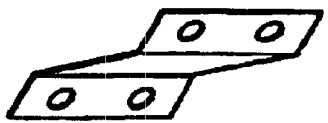

As shown in FIGS. 12(a) and 12(b), the flexures preferably are made of thin Berilium-Copper (e.g., on the order of about 5 mil thick in an exemplary configuration). The flexure geometry is such that, when the middle portion is extrapolated towards the HDE, they will intersect at a point, thereby providing a "virtual pivot." It is possible to solve the seek-induced vibration problem by supporting an HDE on a single flexure. However, the system is likely to suffer from shock and vibration forces acting along other axes.

The specific design mentioned above produced a 25 Hz rotational resonant frequency in the theta plane when supporting a 3.5" drive containing 5 disk platters. The use of four flexures provided sufficient rigidity in the three linear directions X, Y and Z and only allowed rotation about the Z-axis of the drive. In this design, the four flexures support the weight of the drive while providing the rotational freedom. A 25-Hz rotational resonance corresponds to a mount much closer to a free pivot, as compared to a traditional computer frame which is more than an order of magnitude stiffer. The settle-out servo has sufficient error rejection capability at 25-Hz, and therefore a performance degradation is not observable as confirmed by the experimental data discussed below.

The tests conducted on this frame according to the present invention provided excellent vibration performance.

Figure 13B:
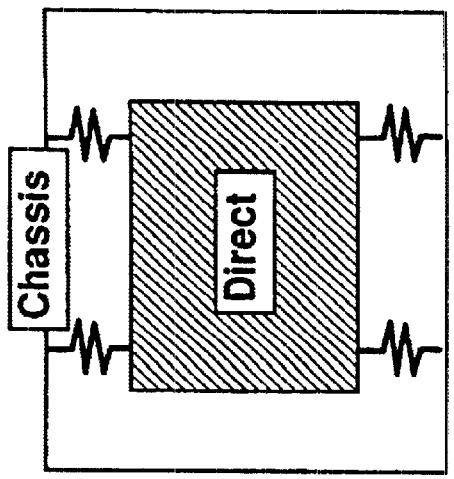
FIG. 13(b) is a schematic of a direct mount on a chassis.
Figure 13A:
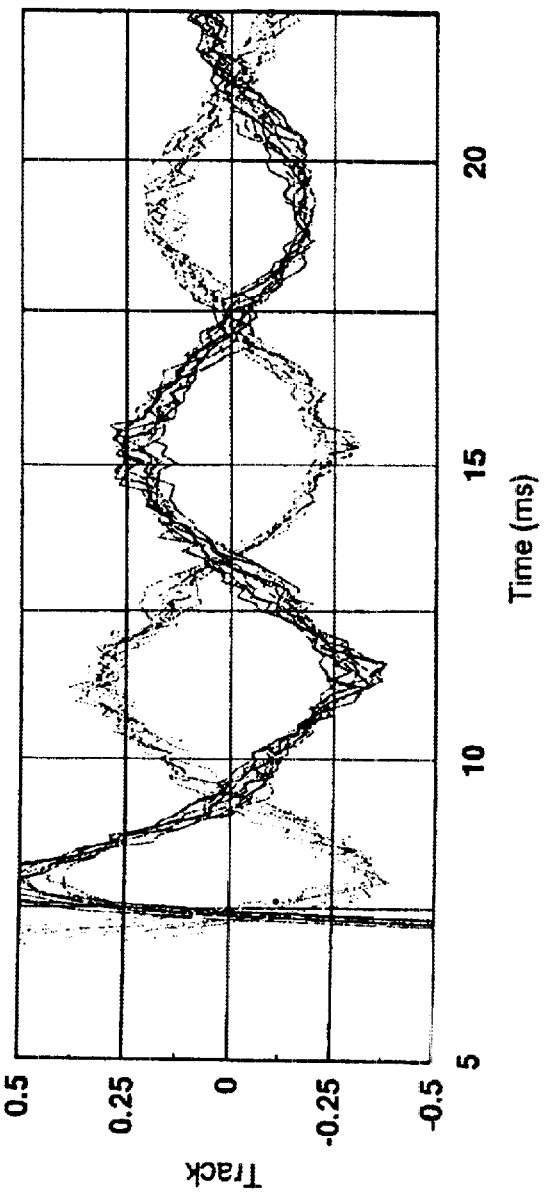
FIG. 13(a) illustrates settle-out characteristics of a disk drive mounted directly on a compliant frame.
Figure 13D:
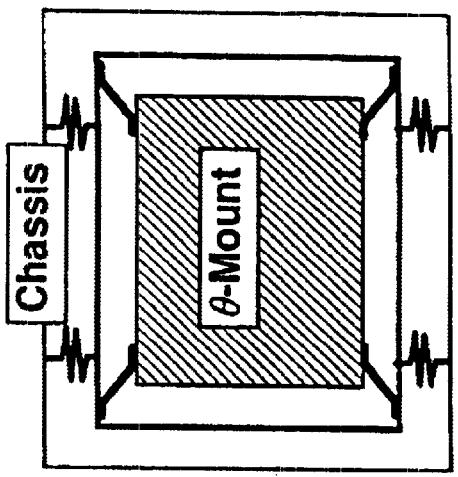
FIG. 13(d) illustrates a schematic of a theta-mount.
Figure 13C:
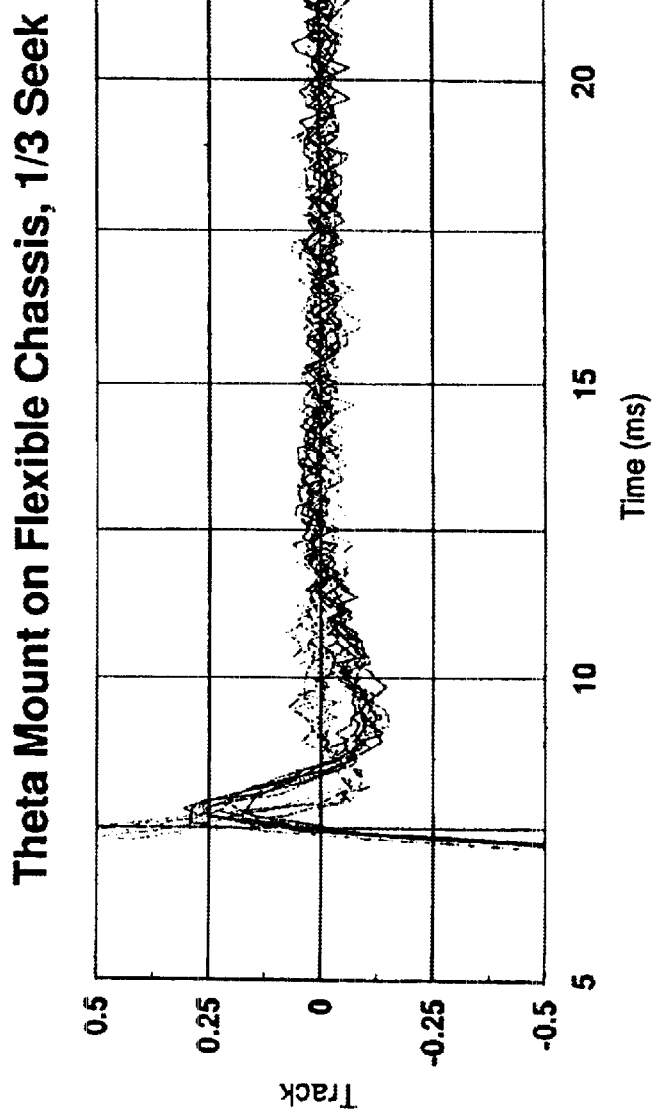
FIG. 13(c) illustrates settle-out characteristics of a disk drive on theta-mount attached to compliant frame.

FIGS. 13(a) and 13(c) respectively show a comparison of the settle-out behavior between a direct attached HDD (e.g., see schematic of FIG. 13(b)) and theta-mount (e.g., see schematic of FIG. 13(d)) attached to a flexible chassis representing a computer frame. It is obvious from the seek dynamics data that the application of angular momentum principle works very effectively in eliminating the effect of seek-induced dynamics. FIG. 13(c) clearly shows that all components are eliminated with no affect on the drive. As mentioned, the schematics of FIGS. 13 (b) and 13(d) correspond to direct and theta-mount condition, respectively. As observable from the data, the mount resonance of 25 Hz does not affect the settle-out characteristics in a measurable way.

Figure 14:
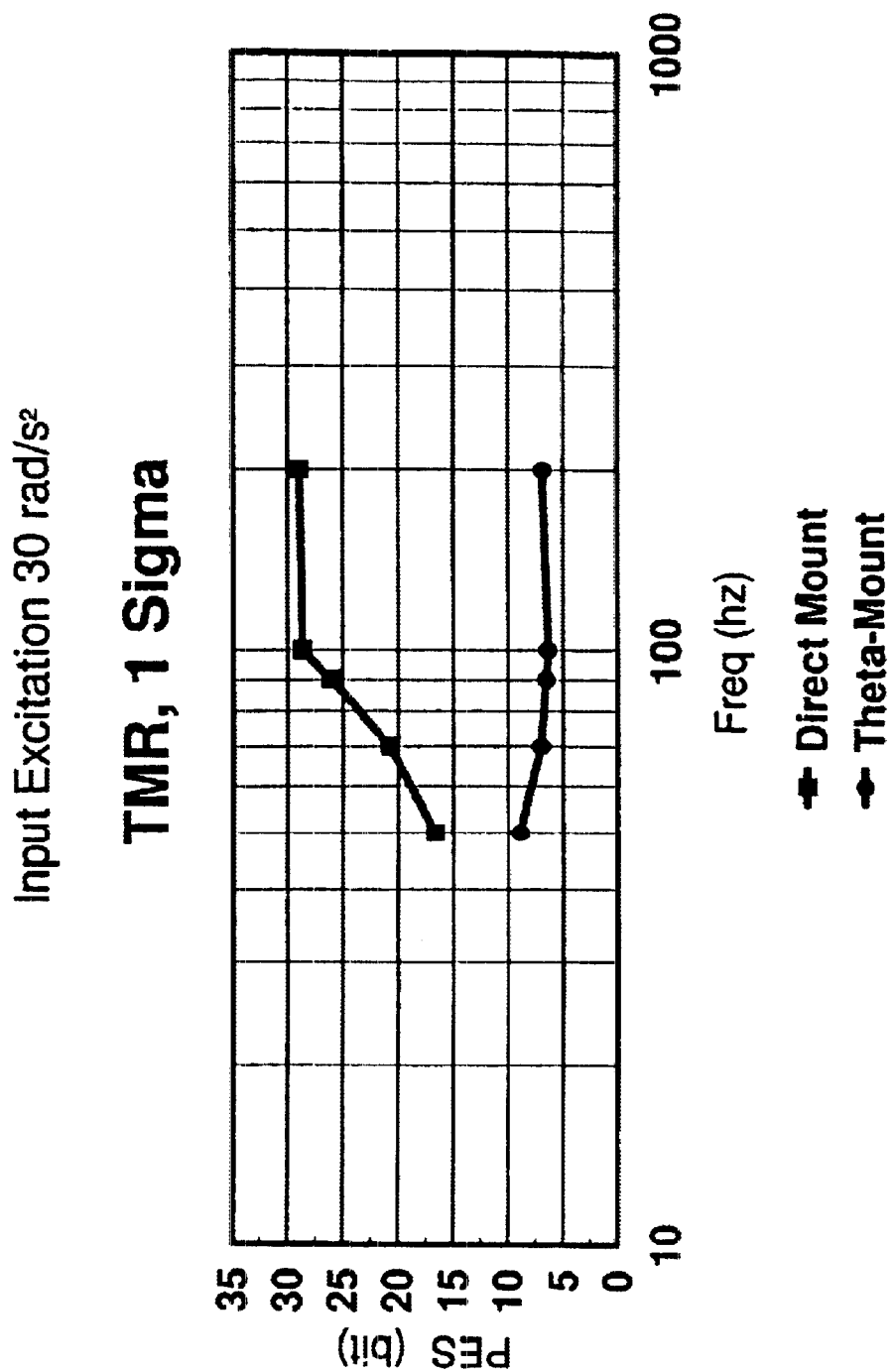
FIG. 14 illustrates track misregistration (TMR) characteristics of an HDD with and without a theta-mount due to rotational vibration input.

FIG. 14 shows the effect of external rotational vibration on TMR where position error signal (PES) is shown in terms of bits (256 bits=1 track pitch=0.1 mil). For a chosen input amplitude of 30 rad/s2, the TMR increases with excitation frequency for the directly-mounted configuration (e.g., see upper plot of FIG. 14), whereas with a theta-mount according to the present invention, the HDD (e.g., see lower plot of the graph of FIG. 14) is almost completely insensitive to angular vibration of the external frame. Hence, an effective rotational vibration isolation property is achieved simultaneously by the theta-mount.

Figure 15:
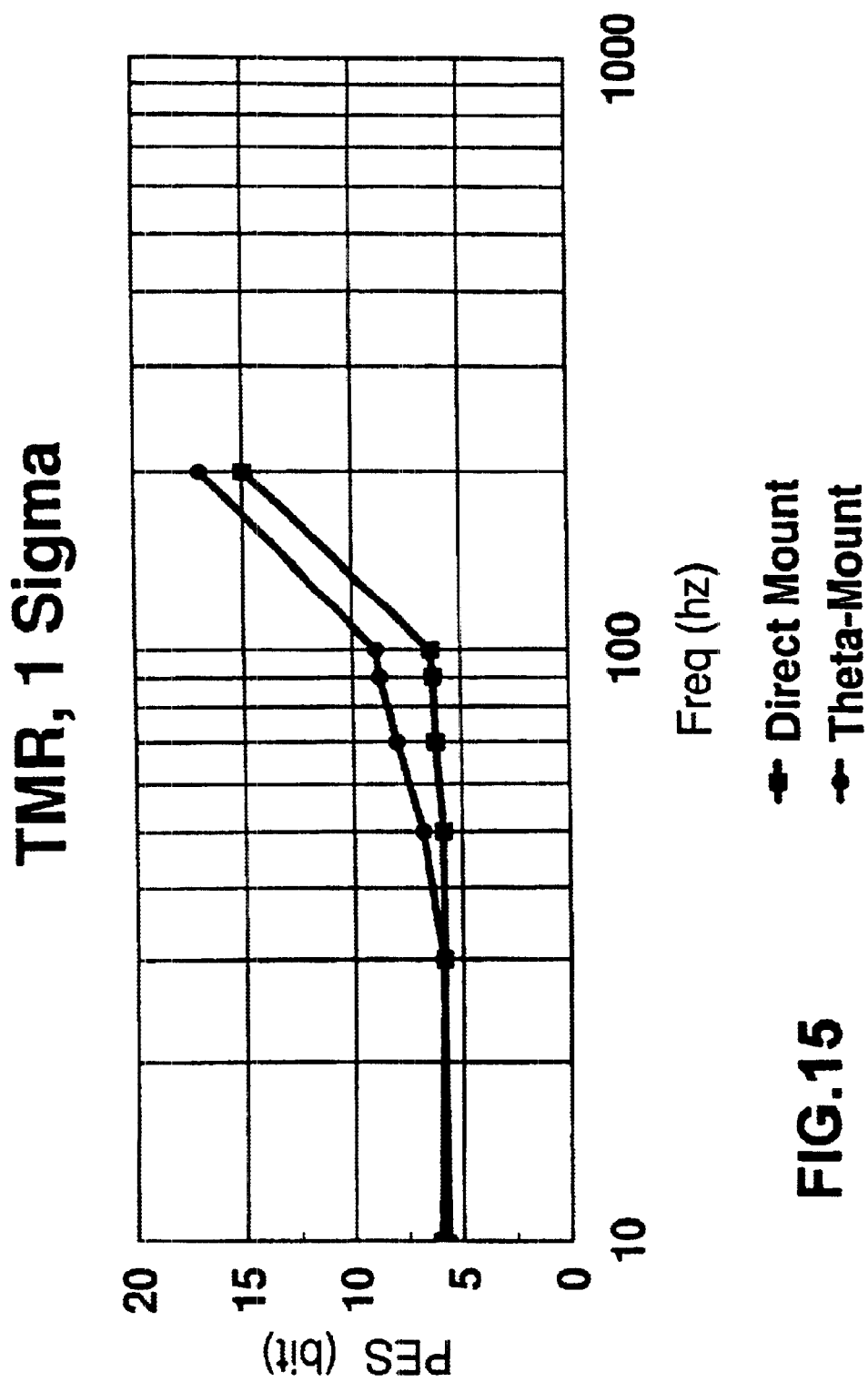
FIG. 15 illustrates TMR characteristics of an HDD with and without a theta-mount due to linear vibration input.

FIG. 15 shows the effect of linear input vibration. For the exemplary design according to the present invention, a slight degradation in TMR is observed for a theta-mounted HDD. However, the theta amount degradation is not substantial so the results are acceptable. That is, by adjusting the position of the HDD's center of gravity, this TMR component can be brought closer to a direct mounted system.

FIGS. 16(a) and 16(b) show the measured emitted angular vibration of the mounting frame during a 1/3 seek operation. FIG. 16(a) illustrates the direct mounting of the HDD, whereas FIG. 16(b) illustrates the theta-mount of the present invention.

It is noted that the emitted angular vibration (e.g., expressed as milliGs by measuring the differential output of two linear accelerometers separated by 2.0" ) displays the benefits of the invention. That is, as shown in FIG. 16(b), the flexures almost eliminated entirely the seek reaction seen at the attachment location. Therefore, a theta-mount according to the present invention is very attractive in, for example, server class computers where interference between a multitude of HDDs must be kept at minimum in order to achieve best data rate.

Second Exemplary Design

Figure 17:
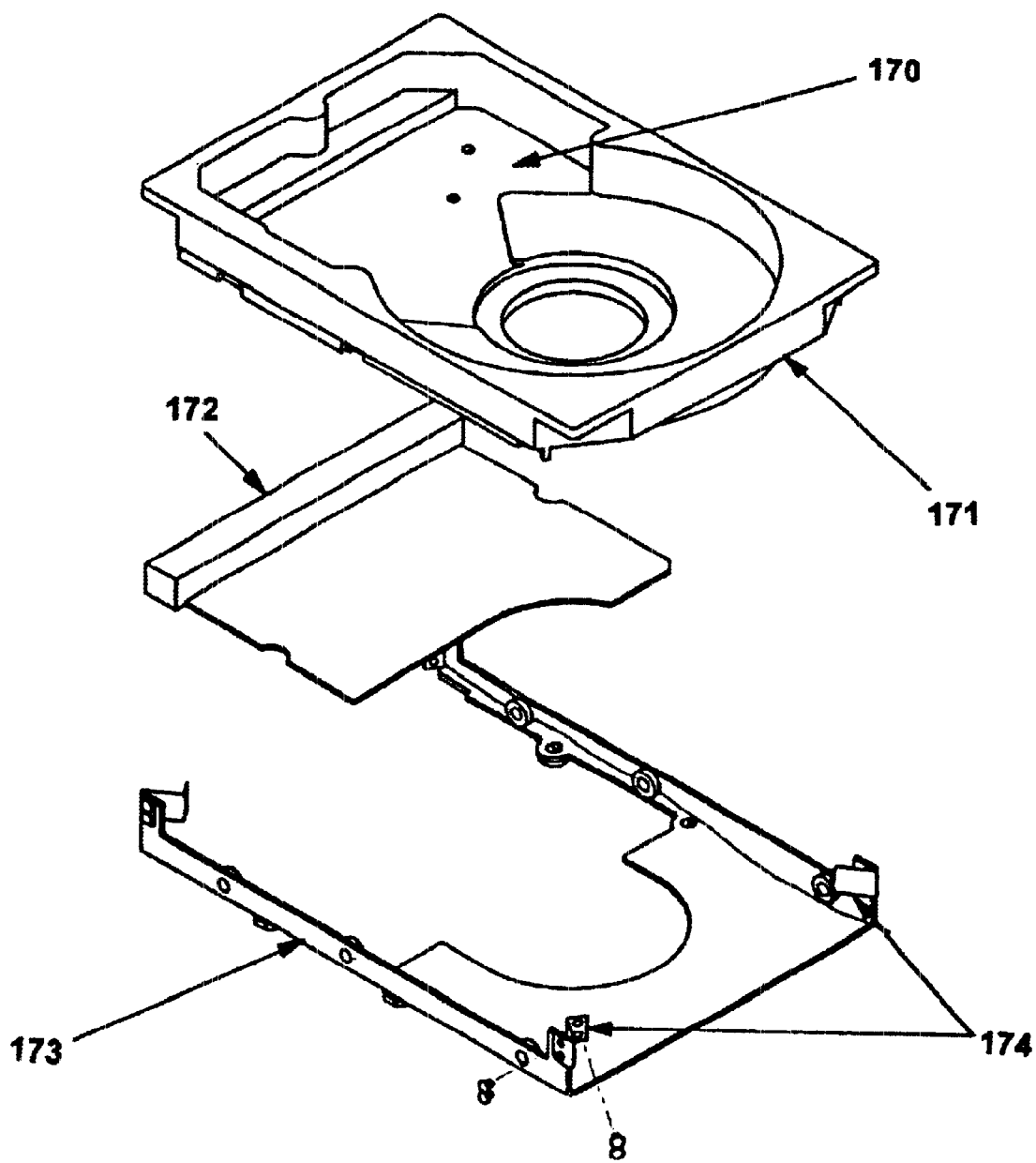
FIG. 17 illustrates an exploded view of an in-form-factor flexure-based theta-mount.

A second exemplary design, as shown in FIGS. 17 and 18, uses a modified base plate structure to incorporate a theta-mount according to the present invention, within the standard 3.5" form factor of the drive (i.e., in-form-factor design). The prototype design incorporates an outer frame 173 design which packages into the existing volumetric envelope presently realized by the 3.5" form factor. The HDD (baseplate 171) itself forms the inner-frame onto which flexures 174 are attached.

As shown in FIG. 17, the second exemplary design includes an HDD 170 with its cover and internal components removed for clarity. The HDD casing 171 is coupled to (e.g., fitted onto) an electronics/connector module 172, the both of which are in turn coupled to (e.g., fitted into) a theta mount (sheet metal/casting) module 173. This outer frame 173 includes a plurality of flexures 174 which may be welded, riveted, and/or screwed onto the frame 173 and HDD casing 171.

FIG. 18(a) shows the fabricated module of FIGS. 17(a)–17(b), with FIG. 18(b) showing the flexure details (e.g., outlined by phantom lines in FIG. 18(a)).

In this approach, the inventors have modified the existing HDE base casting, so as to maintain the integrity of the present industry standard mounting scheme and without disturbing any functional features of the internal construction of the baseplate. FIGS. 19(a) and 19(b) show the detail of the flexure for achieving an "in-form-factor" design.

Third Exemplary Design

FIG. 20(a) illustrates a plan view of an HDD 200 mounted in an inner frame 201 having a flexure 202, which in turn is mounted in an-outer frame 203. The HDD center of gravity is shown at reference numeral 204 and a pivot-fixed center of rotation (e.g., offset from the center of gravity) is shown at reference numeral 205. FIG. 20(b) illustrates the HDD with the outer frame removed to show the pivot 204 in greater detail.

FIGS. 20(a) and 20(b) illustrate a third exemplary design in which the rotation point was fixed by providing a pivot 205 via a journal bearing represented by pivot 205 itself.

The journal bearing 205 is for supporting the weight of the drive 200, and the flexures 202 are used to restore the drive to a neutral position under idle mode. In this design, the pivoting axis of the journal bearing 205 and the pivoting axis of the flexure system should preferably coalesce to a single axis. Otherwise, the configuration is over-constrained and free rotation of the drive, in the desired theta plane, will be rendered difficult or the system may shift in the plane of desired rotation. In the tested prototype, the flexures 202 had to be softened to allow a minimum amount of stretching action while providing the rotational freedom. This was performed by forming the flexures into an "S" shape configuration. The results from the third exemplary design were found to be comparable to the first exemplary design.

Several modifications to the theta-mount can be advantageously made. For example, the bearing that provides the positive pivotal point (e.g., in contrast to the virtual pivot provided by pure flexures) as shown in FIGS. 20(a) and 20(b) can be extended to provide a symmetrical bearing structure so that center of gravity off-set along Z-axis will not produce roll or pitch dynamics of the HDE about X and Y axis for linear input vibration along Y and X axes, respectively. This design is schematically presented in FIGS. 21(a) and 21(b) which respectively illustrate a theta-mount and an exploded view of a top and bottom bearing theta-mount. As shown in these FIGS., the HDD 210 includes a top bearing mount 211 and a bottom bearing mount 212.

It is noted that the bearing technology may be formed of various types such as a ball bearing, a journal bearing, an air-bearing, or an active squeezed film bearing. In the case of an active bearing, the power for operating the bearings is derived from the disk drive electronics. If an externally-pressurized bearing is used, the air supply could be provided by a pump integrated with the drive, or it could be generated by the spindle motor structure. In addition, the HDE could be supported at its edges by flexures.

In another embodiment, as shown in the exploded view of FIG. 22, the HDE (e.g., 220) could be supported by a non-flexure type bearing 221 at its corners. The corners would provide rotational freedom between the HDE 220 and the mount frame 222 where the sliding elements will form an arc of a circle (e.g., shown in FIG. 22 as a dotted line). The circle's center (e.g., pivot 5 point 223) is located at the center of gravity of the HDE.

As shown in FIGS. 23(a) and 23(b) which respectively show a perspective view and an exploded perspective view of a HDD 230 having a top flexure mount 231 and a bottom flexure mount 232, the flexure based theta-mount provides an opportunity to minimize acoustic coupling between the HDD and the computer structure. By choosing a material that would offer both elastic behavior as well as damping, the acoustic energy flow can be limited. Heat transfer through conduction is nevertheless degraded by a theta-mount supported by thin flexures 233 (e.g., about 5 mil), each having a height of about 1 mm. These are on both the top and bottom mounts. However, by deploying a multitude of thin flexures 232, the design can be optimized.

FIGS. 23(a) and 23(b) show a modified flexure-based pivot which allows maximum removal of spindle generated heat. A multiple "spoke"-like layout allows the heat flow while providing the theta-mount function. Thus, it is noted that a spoke array of flexures may be provided.

Figure 24A:
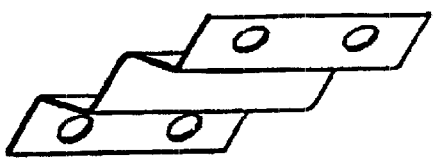
FIGS. 24(a)–24(e) illustrate alternative flexure designs.
Figure 24B:
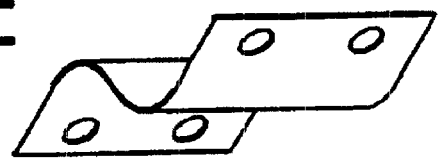
Figure 24C:
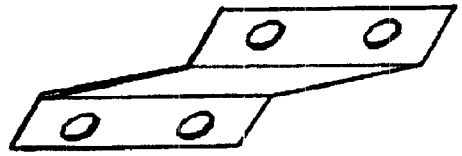
Figure 24D:
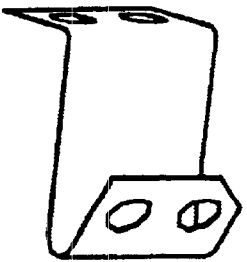
Figure 24E:
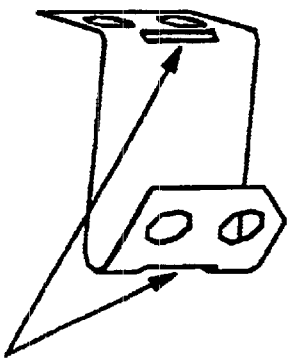

FIGS. 24(a) through (e) show variations in the design of flexures that would facilitate either out-of-form-factor (e.g., FIGS. 24(a)–24(c)) or in-form-factor (e.g., FIGS. 24(d)–24(e)) theta-mount design.

FIG. 24(a) shows a Z-design where the primary motion is tangential about the pivot point. Flexures that allow not only tangential displacement, but a substantially low radial displacement are the S-design and the accordion design respectively shown in FIGS. 24(b) and 24(c). Such freedom is required to relax the constraint of the design when a positive pivot point is provided by a bearing such as that shown in FIG. 20.

For the In-Form-Factor theta mount, FIG. 24(d) shows a plain flexure design, whereas a slotted flexure is shown in FIG. 24(e) which allows lower stiffness (e.g., for a given Z-height) in the tangential direction, while maintaining high stiffness along coordinates involving Z-direction height. It is noted that it is possible to use different types of flexures on the same HDD mount.

Thus, the invention can make any one or more of the X, Y, and Z-axes more or less compliant if necessary.

Figure 25:
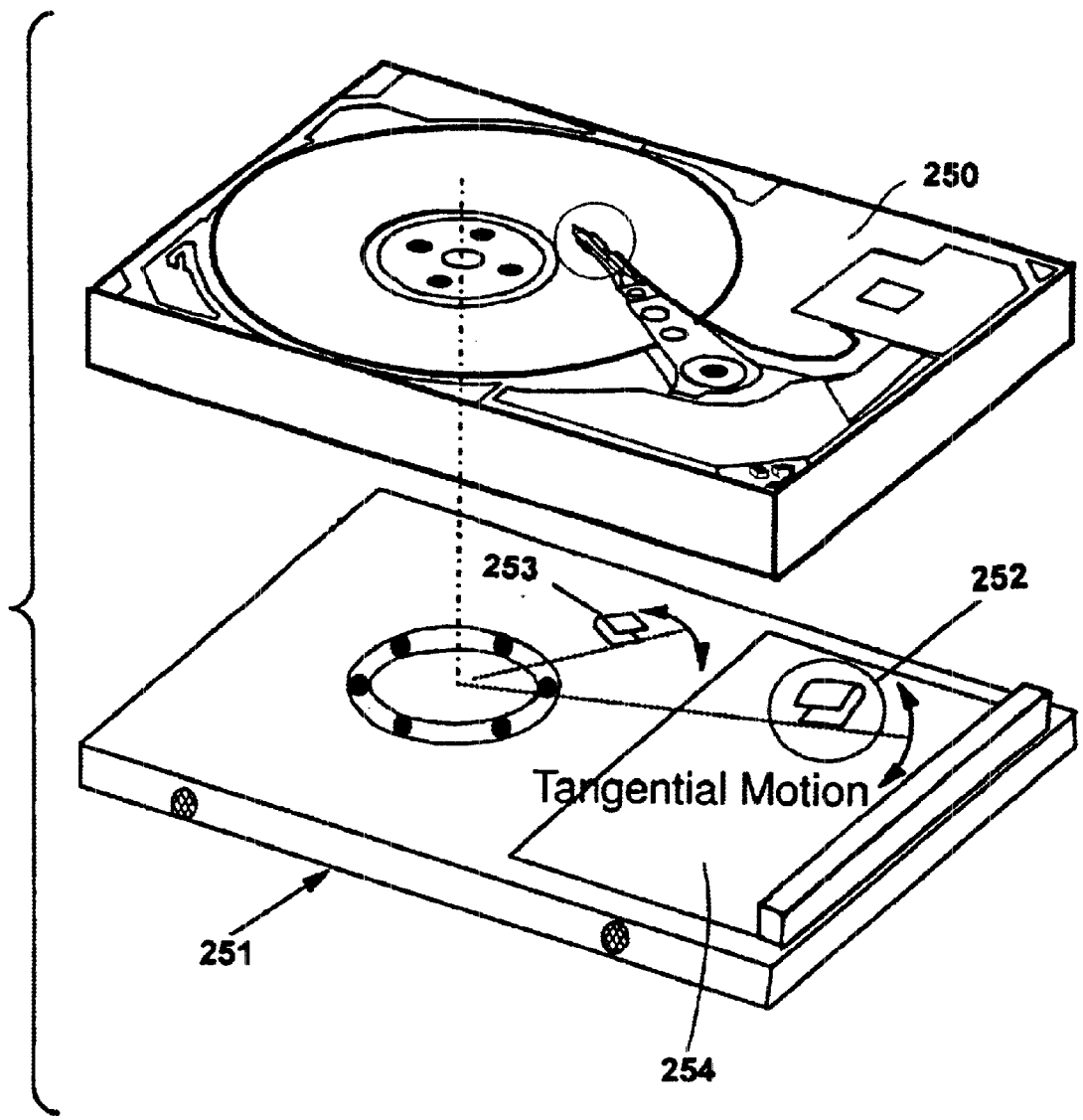
FIG. 25 illustrates a method of providing electrical connection to internal electronics, with an interface connector stationarily held with the user mounting frame.

FIG. 25 shows an example where a flexible electric circuit 252 is used to free the mounting frame 251 motion from the HDE 250 motion and allows the electronics card 254 to be attached to the frame instead of the HDE. Similar arrangement is made to provide power to the spindle motor as well, via a link 253. The relative displacement between the HDE 250 and the mounting frame 251 (e.g., having a 3.5" form factor) for a 0.1 deg rotation is less than 0.1 mm at a distance 50 mm away from the pivot point of HDE. This is a very small mechanical motion that can be provided relatively easily using a flexible circuit link. Thus, a flexible electrical card can be provided for increased flexibility and applications.

Figure 26:
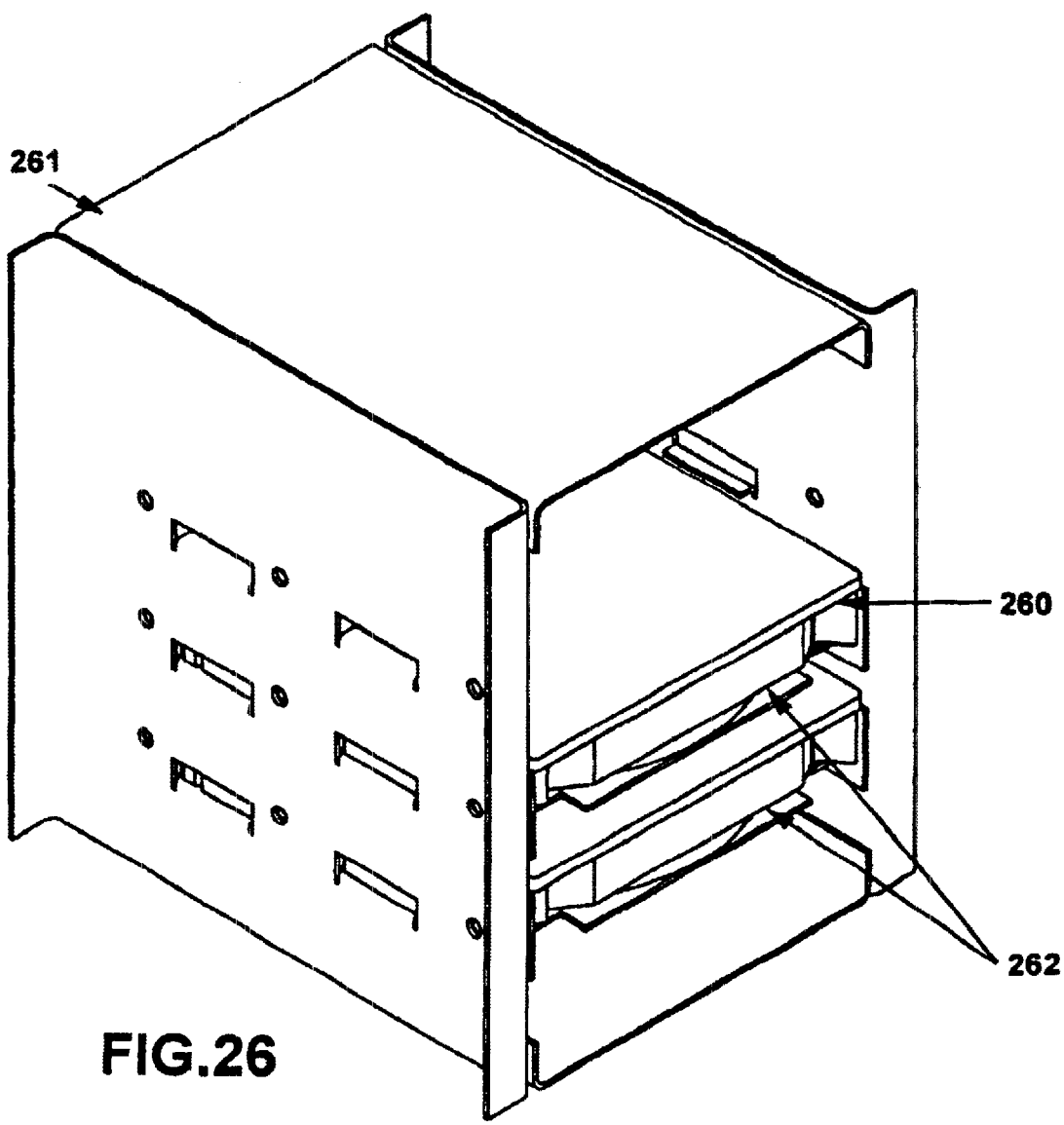
FIG. 26 illustrates a computer chassis integrated with a set of theta-mounts for high performance configuration.

FIG. 26 shows how a theta-mount 260 can be employed as an integral part of a computer chassis 261 rather than a feature included as a part of an HDD 262. This design will find benefit especially with server/storage system manufacturers. The computer sheet metal frame itself can be modified to function as a theta-mount by innovative design rather than using a separate inner-outer frame structure.

Figure 27A:
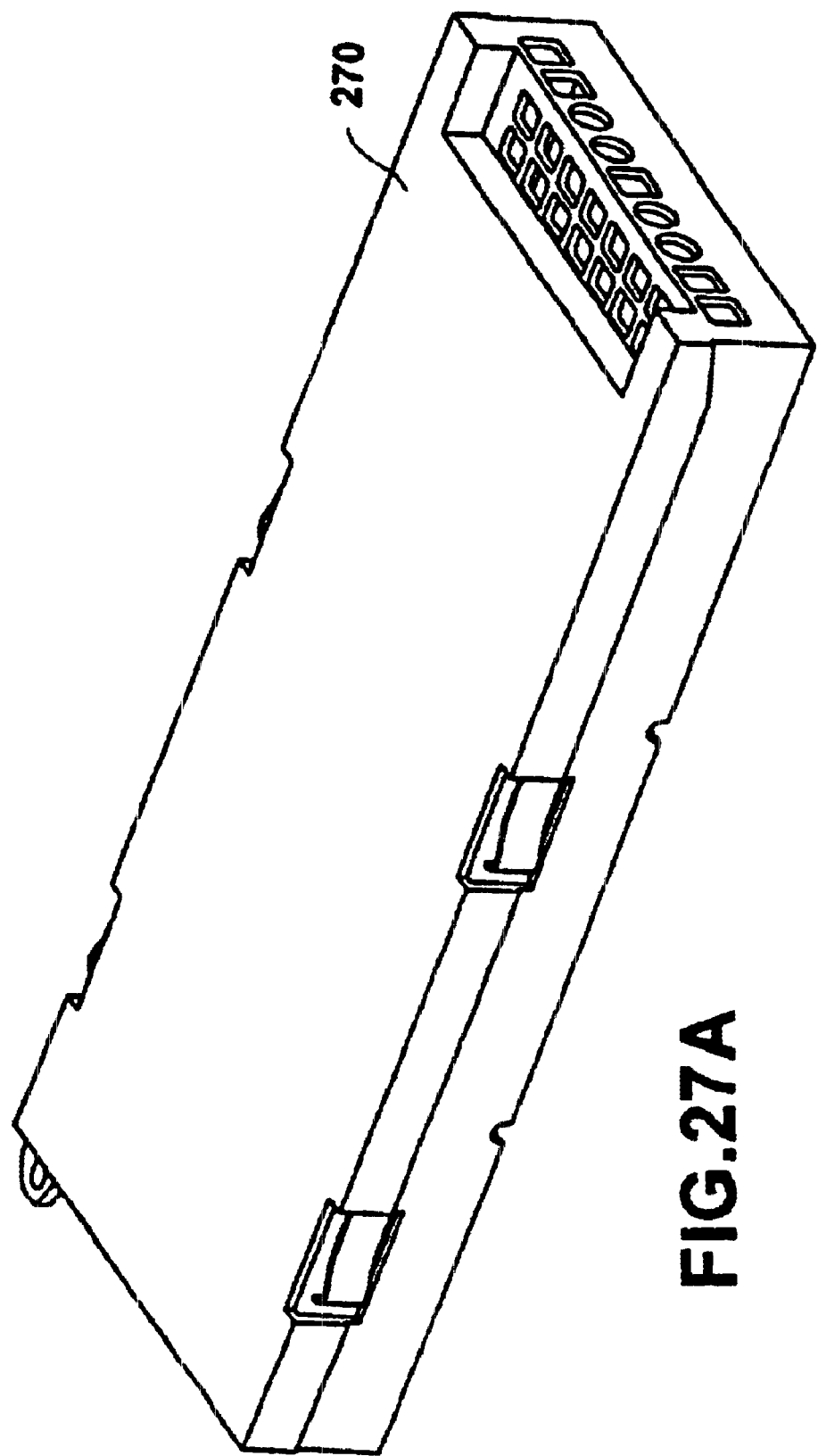
FIGS. 27(a) and 27(b) illustrate a removable HDD with a theta-mount for arrays and servers, with FIG. 27(a) showing a top cover of the module and FIG. 27(b) showing the bottom cover of the module.
Figure 27B:
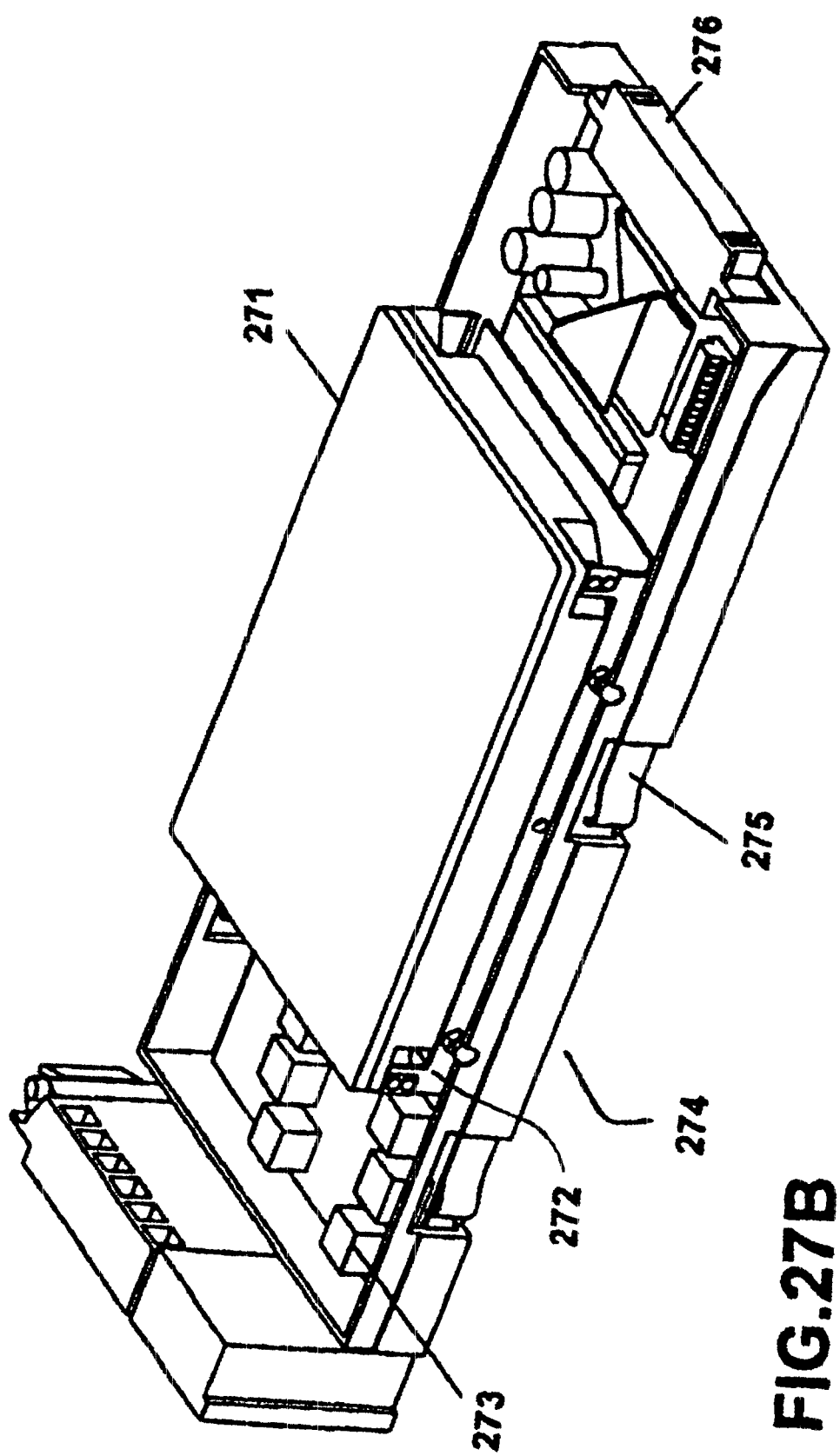

FIGS. 27(a) and 27(b) show an option that is useful for RAID arrays and server systems where "hot swapping" of drives is a routine operation. FIGS. 27(a) and 27(b) respectively show a top cover of a module 270 and a removable HDD 271 with a theta-mount 272 encapsulated within a case. FIGS. 27(b) also shows the support electronics 273, a bottom cover of the module 274, a hot pluggable rail and latch system 275 and a connector 276 to a computer or the like. Thus, the theta mount may be provided as a removable module with signal conditioning.

FIGS. 28(a)–(f) show electrical connector designs that provide rotational freedom of movement between the drive electronics card connector and an external connector. This would allow the drive card electronics to remain attached to the drive and not be moved to the theta mount outer frame as was taught by FIG. 25. These could be used with conventional HDDs that are used with out-of form-factor theta mounts or which are encapsulated for other requirements. They could also be used for removable modules as taught by FIG. 27 and would also be beneficial to a server/storage array as taught by FIG. 26.

For example, a theta mounted HDD 280 is shown in FIG. 28(a). The details of the connector are shown in FIG. 28(b) and includes a connector 281, attached to the drive electronics card (which is mounted directly to the HDD), a folded flex cable 282 coupled to the connector 281 and at another end to a connector 283 which is attached to the computer (not shown) or the like. As shown by the double headed arrows A, the connector is free to move in a lateral motion normal to the direction of insertion of the connector 281 into the HDD 280.

Similarly, FIG. 28(c) illustrates a theta-mounted HDD having a connector portion, the details of which are shown in FIG. 28(d). This arrangement is similar to that of FIG. 28(b), but a slotted flex cable is utilized instead of the folded flexible cable of FIG. 28(b). The large length to width ratio of each "finger" of this slotted cable allows the connector 281' to move freely in the direction shown by the double headed arrow A' with a minimum of resistance.

Further, FIG. 28(e) illustrates a theta-mounted HDD having a connector portion, the details of which are shown in FIG. 28(f). This arrangement utilizes a top and bottom connector 281A and 281B. Top connector 281A is attached to the computer connector 283" while the lower connector 281B is attached to an HDD 280". A vertical linkage 284 is formed between the top and bottom connectors. A slotted flex cable 282" is utilized, interposed between the vertical linkage 284, to connect connector 281A to the connector 281B instead of the folded flex cable of FIG. 28(b). The relative motion between connectors 281A and 281B is shown by the double headed arrow A".

Figure 29A:
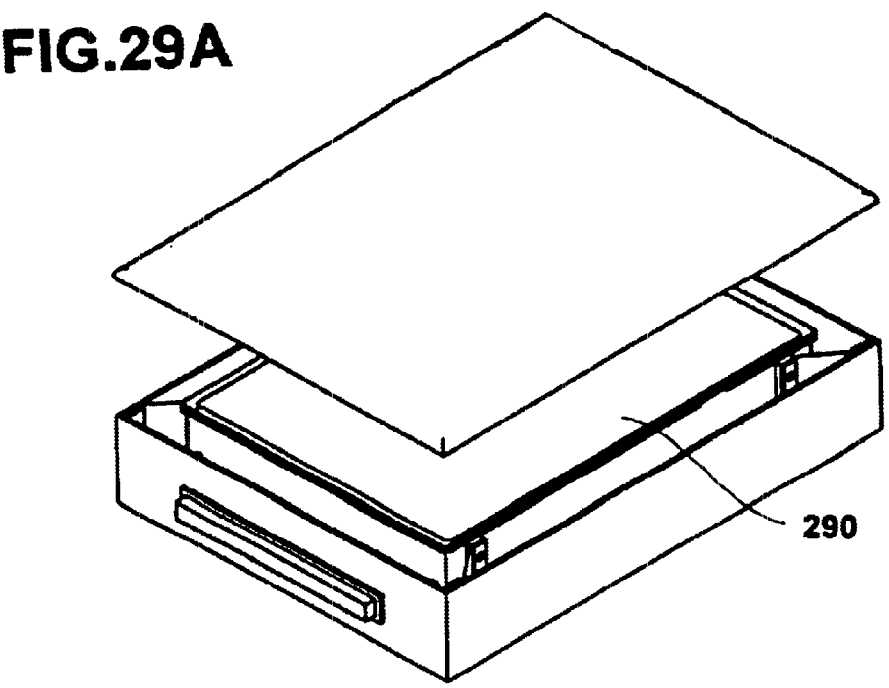
FIGS. 29(a) and 29(b) illustrate a theta-mounted HDD filled with a compliant compound to increase damping and heat transfer.
Figure 29B:
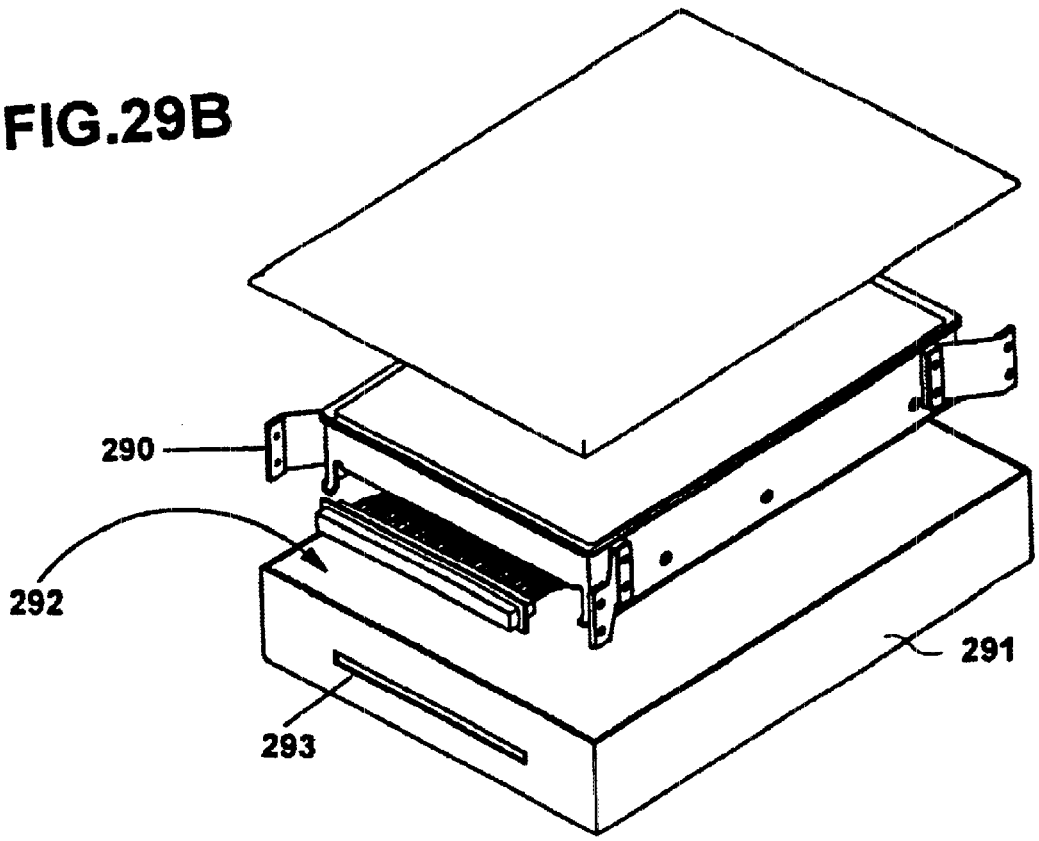

FIG. 29(a) and 29(b) show a configuration where the space between HDE (e.g., theta-mounted HDD 290) and external frame 291 or encapsulating module (of FIG. 27) is filled with a compliant material 292 that would act as a vibration damper, as a heat transfer medium, and/or as an acoustic buffer. The details of the connector 293 are shown, for example, in FIG. 28(b). Thus, the external frame may be filled with acoustic and/or heat reducing material (e.g., liquid, flexible polymer etc.) which allows free rotation and yet serves as a heat sink and acoustic damper.

Thus, with the unique and unobvious aspects of the present invention, the three vibration challenges of an HDD are solved, in a simple, low-cost solution to the seek-induced transient dynamics.

Moreover, the novel mounting frame is more robust against vibration. That is, the invention provides a system in which a seek induced settle-out dynamics problem has been solved using a unique rotational mount concept by effectively compensating for the three vibrational components (e.g., self-generated vibration, external vibration, and emitted vibration) to provide a high performance computer storage configuration.

It is noted that the same design principles are easily extended to HDDs having any other form factor different from a 3.5".

Thus, with the invention, a 2.5" form factor HDD can be mounted in a notebook computer with a theta mount which will improve rotational vibration performance while providing rotational shock protection. Further, a disk drive can be mounted in an automobile with a theta mount to protect the drive from engine and ride-induced vibrations. Additionally, hand held devices with a 1" HDD can have improved shock and vibration characteristics with the use of a theta mount.

While the invention has been described in terms of preferred embodiments, those skilled in the art will recognize that the invention can be practiced with modification within the spirit and scope of the appended claims.

What is claimed:

1. A system for mounting a hard disk enclosure (HDE), comprising:
   a casing for pivotably mounting and linearly constraining said HDE, said casing including a mechanism for minimizing all of settle-out dynamics, external rotational vibration, and emitted vibration.

2. The system according to claim 1, further comprising a bearing system, coupled to said casing, for providing said pivot action as a positive pivot point.

3. The system according to claim 1,
   wherein said mechanism includes a plurality of flexures, coupled to said casing, for providing a virtual pivot point.

4. The system according to claim 3, wherein said flexures are coupled to corners of said HDE, and wherein said center of gravity of said HDE is matched with a pivot axis of said casing, thereby to decouple external linear vibration from rotational vibration of said HDE.

5. The system according to claim 1, further comprising a spindle, coupled to said casing and having a spindle rotation axis,
   wherein the spindle rotation axis is matched with a pivot point of said HDE, to minimize a harmonic vibration of said spindle.

6. The system according to claim 1, wherein said mechanism includes a theta-mount coupled to said casing and a hard disk drive (HDD) integrated with said theta-mount and positioned in said casing as an out-of-form-factor design.

7. The system according to claim 1, wherein said mechanism includes a theta-mount coupled to said casing and a hard disk drive (HDD) integrated with said theta-mount and positioned in said casing as an in-form-factor design.

8. The system according to claim 1, wherein said casing is formed as a portion of a computer frame for receiving said HDE.

9. The system according to claim 1, wherein said mechanism includes a theta-mount coupled to said casing, said theta-mount being formed with a hard disk drive as a removable module.

10. The system according to claim 1, further comprising a spindle and a plurality of flexures formed on said casing for increasing heat removal from said spindle.

11. The system according to claim 1, further comprising a computer frame for receiving said casing and a flexure material coupled to one of said casing and said computer frame for providing a barrier to acoustic energy flow onto one of said casing and said computer frame.

12. The system according to claim 1, further comprising an external frame for receiving said casing, and a material filling a space between said casing and said external frame for serving as any of a vibration damper, a heat transfer medium, and an acoustic buffer.

13. The system according to claim 12, wherein said material comprises at least one of a liquid and a compliant compound.

14. The system according to claim 1, wherein said mechanism includes a theta-mount having a plurality of supports coupled to said casing.

15. The system according to claim 14, further comprising a spindle associated with said casing, wherein a center of gravity of an entirety of a moving system of the HDD, a pivot point of the theta-mount and an axis of rotation of said spindle each share a single axis.

16. The system according to claim 15, wherein the spindle rotates at the center of gravity (CG) and at a pivot pin.

17. The system according to claim 1, wherein said HDE is contained within said casing and includes a spindle, said casing including a pivotably mounted inner frame, an outer frame, and a rotational support provided between said inner frame and said outer frame, wherein said HDE is mounted to the inner frame of said casing, and wherein a center of gravity of the HDE combined with said inner frame is initially at other than an axis of rotation of said spindle.

18. The system according to claim 17, wherein said rotational support includes a single bearing support for said disk drive.

19. The system of claim 17, wherein a pivot-point of the rotational support is provided by one of a bearing and a plurality of flexures.

20. The system according to claim 1, wherein a disk platter diameter accommodated by said HDE is selected to be smaller than a standard form factor disk diameter, said stand form factor disk diameter being a 3.5" form factor.

21. The system according to claim 1, wherein said mechanism includes a rotational support which provides a pivot point of said casing, said rotational support comprising one of a bearing and a plurality of flexures.

22. A system for mounting a hard disk enclosure (HDE), comprising: a casing for pivotably mounting and linearly constraining said HDE, said casing including a mechanism for minimizing all of settle-out dynamics, external rotational vibration, and emitted vibration; and said HDE being contained within said casing and including a spindle, said casing including a pivotably mounted inner frame, and an outer frame, wherein a center of gravity of said HDE is initially at other than an axis of rotation of said spindle, wherein said HDE is mounted to the inner frame of said casing, wherein an additional mass is provided on said HDE to move the center of gravity of the HDE combined with said inner frame towards the axis of rotation of said spindle, and wherein said mechanism restores a movable part of the system to a neutral position so as to center the movable part of the system with respect to the outer frame.

23. A disk drive assembly for mounting to a computer chassis, comprising:
   a hard disk enclosure (HDE) containing at least one disk and an actuator; and
   a drive frame including an inner frame for receiving the HDE and having at least one theta-mount provided on said inner frame, and an outer frame for mounting to said computer chassis and including a mechanism for minimizing all of settle-out dynamics, external rotational vibration, and emitted vibration.

24. The disk drive assembly according to claim 23, wherein said HDE is inserted into said inner frame, said inner frame being mounted within said outer frame, and
   wherein said theta mount comprises a mechanical support linking the inner frame and the outer frame, said support including a plurality of flexures.

25. The disk drive assembly according to claim 24, wherein said flexures comprise metallic flexures and are positioned at a plurality of corners of the HDE.

26. The disk drive assembly according to claim 25, wherein said flexures are formed of an alloy of Beryllium and Copper, and
   wherein a middle portion of said flexures is extrapolated towards the HDE, so as to form a point providing a virtual pivot.

27. The disk drive assembly according to claim 24, further comprising a rotational support coupled to said inner frame for providing a pivot point.

28. The disk drive assembly according to claim 27, wherein said rotational support includes a ball bearing, a journal bearing, and an air bearing.

29. The disk drive assembly according to claim 27, wherein said rotational support is for supporting a weight of the drive and the flexures are for restoring the drive to a neutral position under an idle mode of said disk drive.

30. The disk drive assembly according to claim 27, wherein said theta-mount includes a top and bottom bearing theta-mount, with said HDE positioned therebetween.

31. The disk drive assembly according to claim 24, wherein said flexures include a top flexure mount and a bottom flexure mount, formed of a material for minimizing acoustic coupling between the hard disk drive and the computer chassis structure.

32. The disk drive assembly according to claim 24, wherein said flexures have a shape providing for out-of-form-factor theta-mount design.

33. The disk drive assembly according to claim 32, wherein said shape includes at least one of a Z shape, and S shape, and an accordion shape.

34. The disk drive assembly according to claim 24, wherein said flexures have a shape providing for in-form-factor theta-mount design.

35. The disk drive assembly according to claim 23, wherein said HDE is mounted in said inner frame, said inner frame being mounted on said outer frame,
   wherein a center of gravity of said HDE is matched to a pivot-fixed center of rotation.

36. The disk drive assembly according to claim 23, wherein said HDE is supported by a non-flexure type bearing at its corners, such that said corners provide rotational freedom between the HDE and the drive frame.

37. The disk drive assembly according to claim 23, further comprising a flexible electric circuit for freeing the drive frame motion from the HDE motion, and a link for providing power to a spindle motor of said drive.

* * * * *